(12) United States Patent
Stuchi et al.

(10) Patent No.: US 12,543,951 B2
(45) Date of Patent: Feb. 10, 2026

(54) SYSTEM, DEVICE AND METHOD FOR PORTABLE, CONNECTED AND INTELLIGENT EYE IMAGING

(71) Applicant: PHELCOM TECHNOLOGIES S/A, São Carlos (BR)

(72) Inventors: José Augusto Stuchi, São Carlos (BR); Flávio Pascoal Vieira, São Carlos (BR); Diego Lencione, São Carlos (BR); Paulo Victor de Souza Prado, São Carlos (BR); Dimas Tadeu de Oliveira Junior, São Carlos (BR); Frederico Bonfim Rodrigues de Oliveira, São Carlos (BR); José Roberto Santiciolli Filho, São Carlos (BR)

(73) Assignee: Phelcom Technologies S/A, São Carlos Sp (BR)

( * ) Notice: Subject to any disclaimer, the term of this patent is extended or adjusted under 35 U.S.C. 154(b) by 402 days.

(21) Appl. No.: 17/789,748

(22) PCT Filed: Aug. 19, 2020

(86) PCT No.: PCT/BR2020/050330
§ 371 (c)(1),
(2) Date: Jun. 28, 2022

(87) PCT Pub. No.: WO2022/036416
PCT Pub. Date: Feb. 24, 2022

(65) Prior Publication Data
US 2023/0337912 A1    Oct. 26, 2023

(51) Int. Cl.
*A61B 3/14*    (2006.01)
*A61B 3/12*    (2006.01)

(52) U.S. Cl.
CPC .............. *A61B 3/14* (2013.01); *A61B 3/1208* (2013.01)

(58) Field of Classification Search
CPC .............................. A61B 3/14; A61B 3/1208
(Continued)

(56) References Cited

U.S. PATENT DOCUMENTS

| 2015/0002817 | A1* | 1/2015 | Alasaarela | A61B 3/0008 351/208 |
| 2017/0064204 | A1* | 3/2017 | Sapiro | G06T 5/20 |

(Continued)

FOREIGN PATENT DOCUMENTS

| WO | WO-2013/140043 A1 | 9/2013 |
| WO | WO-2016/112310 A1 | 7/2016 |

(Continued)

OTHER PUBLICATIONS

International Search Report & Written Opinion of the International Searching Authority issued in PCT Application No. PCT/BR2020/050330, mailed Jun. 28, 2021.

*Primary Examiner* — Bumsuk Won
*Assistant Examiner* — Mitchell T Oestreich
(74) *Attorney, Agent, or Firm* — ICE MILLER LLP; Justin D. Swindells

(57) ABSTRACT

The present invention relates to a hand-held imaging system, device and method, composed of optical, electronic and mechanical modules, of specific ergonomic and functional design, configured to obtain images and videos in the visible and infrared spectrum of the anterior and posterior segment of the human eye, mainly non-mydriatic retinal exams controlled by an external mobile device, such as a smartphone, tablet or embedded hardware, for clinical purposes.

9 Claims, 27 Drawing Sheets

(58) Field of Classification Search
USPC .......................................... 351/206; 359/206
See application file for complete search history.

(56) References Cited

U.S. PATENT DOCUMENTS

| | | |
|---|---|---|
| 2018/0092530 A1 | 4/2018 | Hart et al. |
| 2018/0116502 A1* | 5/2018 | Ishinabe ................ A61B 3/117 |
| 2018/0153399 A1 | 6/2018 | Fink et al. |
| 2018/0263486 A1 | 9/2018 | Farchione et al. |

FOREIGN PATENT DOCUMENTS

| | | |
|---|---|---|
| WO | WO-2017/180965 A1 | 10/2017 |
| WO | WO-2018/043657 A1 | 3/2018 |

* cited by examiner (a) (b)

(A) (B)

SYSTEM, DEVICE AND METHOD FOR PORTABLE, CONNECTED AND INTELLIGENT EYE IMAGING

CROSS REFERENCE TO RELATED APPLICATIONS

This application is a national stage entry of PCT Application No. PCT/BR2020/050330, filed on Aug. 19, 2020, the contents of which are incorporated herein by reference in their entirety.

TECHNICAL FIELD

The present invention relates to a hand-held imaging system, device and method, composed of optical, electronic and mechanical modules, of specific ergonomic and functional design, configured to obtain images and videos in the visible and infrared spectrum of the anterior and posterior segment of the human eye, mainly non-mydriatic retinal exams controlled by an external mobile device, such as a smartphone, tablet or embedded hardware, for clinical purposes.

A user, usually a healthcare professional with basic training, can use the modular apparatus to carry out eye exams of the anterior and posterior segments in patients located inside or outside clinical environments, since it is not necessary to use any type of medication for dilating the pupil of the patient. The user interface for the exams is an application (computer software) that must be installed on the mobile device and is configured to control its embedded resources such as processor, memory, touch screen display, camera, GPS (Global Positioning System) and communication. It also controls the electronic components of the proposed electronic module, such as light-emitting diodes or cameras, according to the embodiment, through a communication protocol, wired or wireless, between the mobile device and the electronic set.

The exams are generated by synchronizing light pulses with camera capture and are stored in the mobile device memory.

In parallel, using the internet connection of the mobile device, either by mobile network or Wi-Fi, for example, the captured data and exams from the patients are securely stored on servers in the cloud. These exams can be accessed on the internet by doctors who, in possession of the exams and personal data of the patients, are able to diagnose or even monitor the evolution of a clinical condition.

Artificial intelligence (AI) tools to assist the patient diagnosis are also proposed in different levels. This high connectivity and integration with AI tools allow the proposed modular apparatus and its method of use to be fully suitable for telemedicine applications, particularly with teleophthalmology.

BACKGROUND OF THE INVENTION

Retinal observation devices are used to diagnose and monitor numerous eye diseases such as diabetic retinopathy, age-related macular degeneration, glaucoma or infections such as toxoplasmosis and others. They are common equipment for ophthalmologists, optometrists and other health professionals, in addition to veterinarians who use the equipment to treat animals.

The main devices used for fundus observation are retinal cameras, also called fundus cameras, ophthalmoscopes, OCTs (Optical Coherence Tomography) and SLO (Scanning Laser Ophthalmoscope), being responsible for most of the patents and articles in this area that compose the state of the art. Currently, portable devices are gaining more space, mainly due to the development of digital cameras integrated with mobile devices, such as smartphones, and also to its ease of transport and in-field operation, as well as the lower cost. Such factors make it possible to serve communities that were previously either not or poorly served, thus improving visual health conditions.

One of the main difficulties in imaging the eye fundus is due to the number of interfaces that the light must travel through (cornea, aqueous humor, crystalline and vitreous humor) to homogeneously illuminate the retina and allow its imaging without artefacts. In this scenario, the development of compact optical systems that allow the performance of fundus examinations in a portable device is challenging. This is due to a balance between image quality, size of the optical system and cost related to this same system and its image sensor. In this scenario, several approaches have been presented in the known state of the art aiming at the construction of portable equipment for retina diagnosis. Some of these are presented below.

The patent document US20180263486A1 titled "RETINAL IMAGE CAPTURING", by Welch Allyn, published on Sep. 20, 2018, presents an apparatus to produce retinal images that includes memory and a processor that allows manual control of the image capture parameters of the retina, such as the light source of the lighting path, camera and focal adjustment. It differs from the present invention because the proposed optical system has a significantly different layout. The present invention includes an arrangement of doublets and not an objective lens. More than that, it does not have an optical path with specific lenses and mirrors for lighting; all optical components herein are common to imaging and lighting. The autofocus system of the smartphone's own camera is used. Moreover, it is also proposed dedicated electronics powered by the battery of the mobile device.

In the present invention, the control of the entire operation is done by a computer program developed especially for this purpose (application) on the mobile device. The ergonomic and functional design of the present invention is also quite different. The eye protector proposed herein has a different shape from the other proposed solutions previously known in the state of the art, adapting better to the shape of the human face, especially in the eye and nose region, and isolating more efficiently the region of the patient's eye from external light, which facilitates non-mydriatic examination.

The patent document WO2018043657A1 titled "WIDE-ANGLE PUPIL RELAY FOR CELLPHONE-BASED FUNDUS CAMERA", by Nikon Corporation, published on Mar. 8, 2018, presents a handheld fundus camera controlled by a smartphone configured to capture high quality retinal examinations and a high field of view. The system has a set of lenses housed in a smartphone body, having an optical axis, focal length and entrance pupil fixed in space on a plane associated with the smartphone body. It also has an optical telescope with imaging with limited performance because of diffraction in the spectral range from 486 nm to 656 nm. It differs from the present invention mainly in that it deals exclusively with the retinal imaging process, not presenting an effective way of combining the imaging process with the fundus illumination, avoiding unwanted reflections and scattering, both from the optical system and from the cornea and lens of the eye. Still, it does not deal with internal fixation points nor does it discuss the electronic set and ergonomics of use.

The patent document US20180092530A1 title "FUNDUS IMAGE CAPTURE SYSTEM", by Welch Allyn, published on Apr. 5, 2018, presents a system that assists the user in its operation to capture images of the retina. It also presents an algorithm that helps the operator to position the apparatus for capturing exams, check the interest of the obtained fundus image, as well as if it has the appropriate field of view. It differs from the present invention in that it does not have a new optical design that allows capturing high-resolution images of the retina, like the one presented here, and also does not present details and ergonomic benefits for capturing images, focusing only on the software that detects whether image has adequate quality or not.

The patent document US20180153399A1 titled "SMARTPHONE-BASED HANDHELD OPHTHALMIC EXAMINATION DEVICES", by University of Arizona, published on Jun. 7, 2018 presents a device for ocular imaging coupled with a smartphone. It allows capturing the images of the anterior and posterior segment. The patent presents different apparatuses: a microscope for the eye, a portable slit lamp and an ophthalmoscope, all coupled to a smartphone. They differ from the present invention in the ergonomic design presented for the three devices, as well as in the use of external batteries to power the image capture system. Still, for the optical system of the ophthalmoscope, they do not use the concept of lighting and imaging in the same optical path, using components such as a mirror so that the lighting, coming from another path, reaches the retina.

Although several proposals have addressed the subject of portable retinography, none of them presents the differentials presented here to the optical, electronic, mechanical and computing systems that allows integration with mobile devices and the capture of high-resolution images of the retina, without artifacts. In addition, the proposed system has simplified and optimized optics for high performance on mobile devices, which allows the capture of high resolution and high-quality images in a compact and more accessible system.

SUMMARY

The present invention consists of a system, method and handheld device for imaging the human eye, allowing the capture of non-mydriatic retinal images and of the anterior segment, controlled by a mobile external device, preferably a smartphone. A system composed of mechanical, optical, electronic and computational modules, with specific ergonomic and functional design is proposed, which, connected and controlled by an external device, allows capturing images or videos in the visible and near infrared spectrum of the retina and the anterior segment, in high resolution and high field of view, with internal fixation points, for diagnostic purposes.

The method is controlled by an application installed on the external device, which is configured to receive user commands and perform the operations and routines, thus controlling the resources available in the external device, such as its processor, memory, touch sensitive display, camera, GPS and communication, and also controlling the electronic components from the proposed electronic module, such as LEDs in the visible and near infrared spectrum, and cameras, according to the embodiment, through a communication protocol, wired or wireless, between the external device and the proposed electronic module.

Therefore, the exams are captured by user commands performed in the proposed application running on the external device, which, once triggered, generates light pulses in the LEDs of the electronic module proposed that are synchronized with the camera capture and are stored in the external device memory.

In order to enable the non-mydriatic operation for retinal exams, an optical and electronic architecture is proposed, which uses a specific lens arrangement with appropriate correction of optical aberrations, and which has a well-defined focal length, aperture and positioning of the entrance pupil. The optical module also has light sources in the visible and near infrared spectrum and, depending on the embodiment, at least one camera sensitive to this spectral region. Using these components, which are controlled by the external device, the proposed system can illuminate the retina or the anterior segment homogeneously and create images whose quality is limited by the diffraction effect of light, with an instantaneous field of view of up to 60 degrees, according to the embodiment, eliminating unwanted reflections and optical artifacts and, in the case of retinal imaging, the scattering of illumination light on the patient's cornea.

BRIEF DESCRIPTION OF THE DRAWINGS

The objectives and advantages of the present invention will become clearer through the following detailed description of the examples and non-limiting drawings presented at the end of this document.

DETAILED DESCRIPTION OF THE INVENTION

The proposed system, method and device allows various forms of implementation, with different integrated technologies as well. For its correct functioning, however, the ergonomic, mechanical, electronic, computational and optical design must be defined and implemented. In this context, the main elements for carrying out the present invention will be presented.

Figure 1:
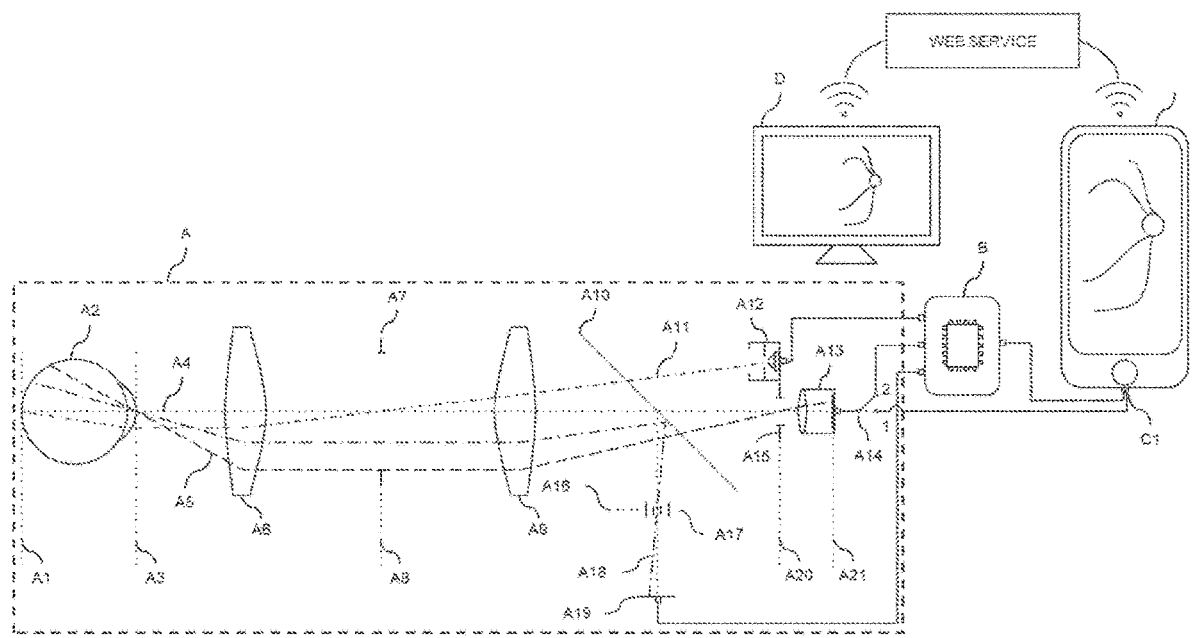
FIG. 1 presents each of the modules necessary for implementing the present invention.

FIG. 1 depicts the general architecture of the invention, involving the optical module (A), embedded electronics (B), mobile device (C) and web application (D). More specifically, this architecture is shown in region A of FIG. 1, which illustrates the retinal imaging process and shows the main components of the invention as well as the main raytracing for imaging, lighting and for the internal fixation for patient's gaze during examination. The optical module is provided with a high level of compactness since all the optical components used are common to retinal imaging and lighting. The proposed optical module does not have a specific optical path for the lighting, which contributes to its high level of compactness, ease of assembly and cost reduction. In addition, a compact lighting module is proposed, consisting of a light-emitting diode in the visible spectrum and one or more light-emitting diodes in the infrared spectrum, arranged in the optical assembly in a way that a single light source is enough to illuminate the eye fundus homogeneously, without generating unwanted artifacts for imaging, such as the reflection and scattering of illumination light in the patient's cornea.

The optical set also has a compact module for internal fixation that does not have any other optical component besides the beam splitter that inserts the radiation for internal fixation in the common optical path for retina imaging and lighting. The module is composed by small light sources and a pinhole (FIG. 1—A17) and allows the small points of light to be projected into different locations of the patient's retina. It helps carrying out the examination, since the internal points guides the patient's gaze, as well as the peripheral mapping of the retina.

The embedded electronics, module B in FIG. 1, is responsible for activating the light sources for illumination, both in continuous and pulsed modes synchronized with the capture by the camera, the activation of the light sources for internal fixation, as well as the camera control, which can have its own integrated optics, according to the embodiment. The proposed electronic module also does not have its own battery, being powered by the battery of the external mobile device C, preferably a smartphone.

An application in embedded software is also proposed, which, once installed in the preferred mobile device C (smartphone), allows the communication with the electronic module, sending commands for capturing images, adjusting the lighting power, changing the internal fixation points, compensation of the patient's diopter, registration of patient data and reports, among others that will be detailed below. Using the internet connection of the external device, the proposed application also allows synchronizing patient data and exams in a cloud system (cloud-computing). A web application, D, is also part of the invention and allows a user to remotely access and manage patient data, exams and reports, as well as access more robust artificial intelligence (AI) functions to aid diagnosis.

By integrating all these modules, which will be detailed in sequence, the operator can carry out high quality eye exams. It is worth mentioning that the proposed device can be integrated with different mobile devices, such as smartphones, tablets, cameras or even specific embedded hardware. The requirement is that this device has a processing unit, data input and output and a camera for capturing images.

Figure 2:
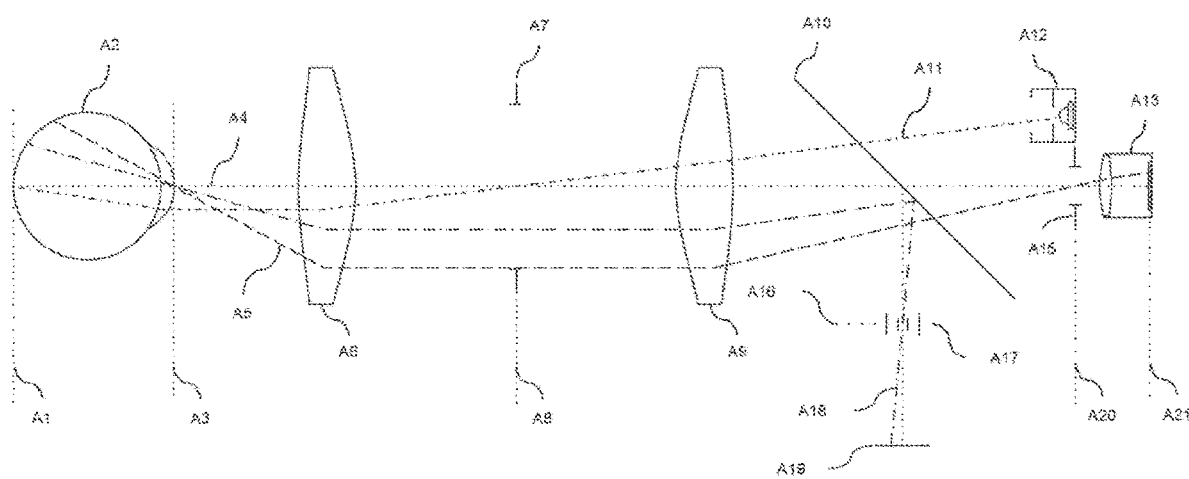
FIG. 2 depicts the general architecture of the proposed optical module A.

Optical Module A and its Internal Components:

The general architecture of the proposed optical module is shown in FIG. 2 that also illustrates the retinal imaging process, where the main components of the optical module proposed are presented, as well as the main ray traces for imaging, lighting and the internal fixation. The optical module has two lens subsets, A6 and A9, and a beam splitter, A10, that are common for retinal imaging and lighting and for internal fixation, wherein the beam initially reflected by the beam splitter A10, passes through subsets A6 and A9 reaching the cornea of the patient in the optical axis. Specifically to the imaging ray tracing, subset A6 forms an intermediate and telecentric retinal image in the mechanical iris, A7, that controls the field of view of the device, located in the A8 plane, as seen on the parallelism between the chief ray, A5, and the optical axis in the A8 plane. The subset A9 conjugates the plane of the patient's cornea, A3, to the optical aperture A15, positioned slightly before the entrance pupil of the camera that has its own integrated optics, A13. The camera lens conjugates the A1 plane, referring to the patient's retina, to the A21 plane, where the image sensor of the camera is located, allowing image capturing. The compensation of the diopter of the patient is performed by the focus mechanism of the camera, either by manual adjustment or by the autofocus mechanism.

Regarding ray tracing for illumination, the optical architecture does not present optical components such as lenses, mirrors, prisms or specific dichroic filters for the lighting set. A compact lighting module is proposed, A12, positioned above the aperture for the retinal imaging rays, A15, which has a light emitting diode in the visible spectrum and one or more light emitting diodes in the infrared spectrum, positioned very close to each other, in a way that, for the optical set, they can be treated as a single point object. The lighting module also has internal baffles to control and prevent the scattering of light inside the optical path, which can generate unwanted artifacts in the imaging process. As a consequence of the telecentricity imposed in the intermediate image of the retina in the plane of the mechanical iris, A7, the subset A9 projects the chief ray of the illumination ray tracing, A11, to cross the optical axis in the plane of the mechanical iris, A8, in such a way that the entire mechanical iris, which is combined with the plane of the retina, is illuminated homogeneously. Subset A6 conjugates plane A20, where the optical aperture and light emitting diodes of the lighting module are located, to the plane of the cornea, A3. Also, when exiting the subset A6, wherein the chief ray of the illumination ray tracing, A11, is telecentric in the region between the device and the eye of the patient, as can be seen by the parallelism between the illumination chief ray, A11, with the optical axis in the region between the patient's eye and the subset A6, which makes the illumination beam to focus in the corneal plane and then diverges and reaches the retina as a homogeneous spot of light that fills the entire field of view observed, as seen on the intersection of the illumination chief ray, A11, in the optical axis and in the retinal plane, A1. In this way, the proposed optical architecture allows a single light source to illuminate the fundus homogeneously and without generating unwanted artifacts for imaging, such as the reflection and scattering of illumination light in the patient's cornea.

The optical set also presents a compact module for internal fixation that does not have any other optical component besides the A10 beam splitter. The module has small light sources, A19, and a pinhole, A17, located on the A16 plane, which is conjugated with the patient's corneal plane, A3. The light emitted by the small points of light, symbolized by the A18 beam, passes through the pinhole and is partially reflected by the A10 beam splitter. The beam reflected then passes through the subsets A9 and A6 and reaches the patient's cornea on the optical axis, and then reaches the retina. As the patient projects his macula when he is looking at the fixation targets, changing the position of the light source in A19, different regions of the eye can be captured, thus allowing the peripheral mapping of the retina and generation of panoramic images, also known as retina mosaics.

Figure 3:
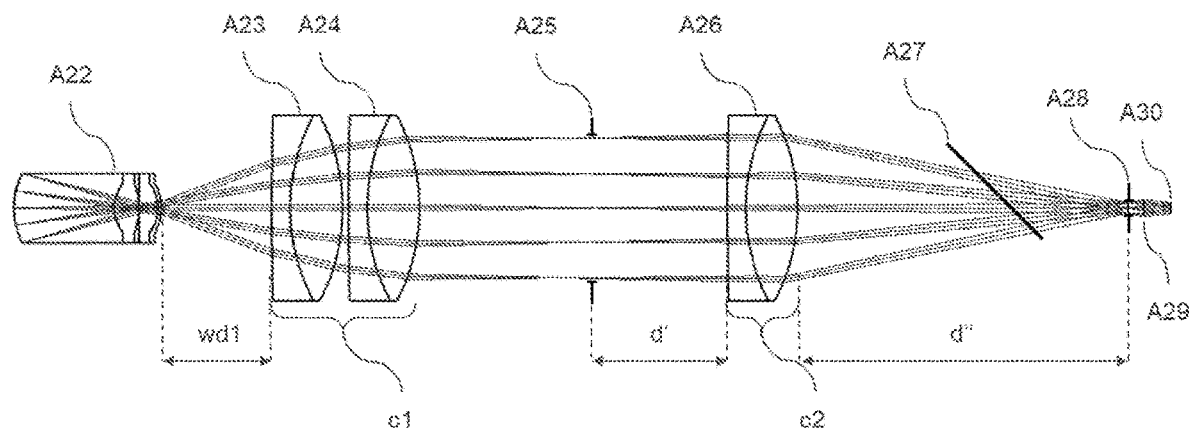
FIG. 3 shows an optical layout for the retinal imaging ray tracing for the first embodiment of the optical assembly.

One of the embodiments of the optical module is shown in FIG. 3, which details the ray tracing for retinal imaging with a 45-degree instantaneous field of view. It depicts the ray tracing from point objects located on the retina of an eye model, A22, used to simulate the structures of the human eye as well as their optical aberrations throughout the field of view observed and which are already well known in the state of the art, until it reaches the image sensor of the camera, A30. In this route, the beams leave the eye simulator and pass through three achromatic doublets, A23, A24 and A26. The doublets have a diameter that varies from 20 to 60 mm, being 35 mm the preferred value, and the focal length varies from 30 to 100 mm, being 70 mm the preferred value. Then, the beams also pass through the mechanical iris, A25, which controls the field of view of the retina, and the beam splitter, A27, which is an optical component that has a well-defined reflectivity and transmissivity. The beam splitter allows the light from the internal fixation points to be inserted into the optical path towards the patient, so that the patient can project his vision on these small points of light during the examination. Next, the retinal imaging beams pass through an optical aperture, A28, which controls the diameter of the light beam coming from the patient's eye, and finally reaches the camera for recording images, which is represented by its set of lenses, A29, and the image sensor, A30.

The main characteristics of the optical set, regardless of the embodiment, are:

Telecentricity of the intermediate image of the retina, which coincides with the plane of the mechanical iris for emetric patients, that is with 0 D. For this to happen, doublets A23 and A24 form an intermediate image of the retina in the plane of the mechanical iris, A25, the distance d" is adjusted to the back focal length (BFL) of the doublet A26, which can vary from 25 to 95 mm, 65 mm being the preferred value, and the distance wd1, between the patient's eye and the device, is adjusted so that the image of the optical aperture A28 coincides with the plane of the cornea, which can vary from 10 to 30 mm, being 21 mm the preferred value.

The distance d', from the mechanical iris to the lens A26, is adjusted so that emetric patients are photographed with the focus of the camera in the middle of its total course. Thus, it is feasible that, through focal adjustment (manual or automatic), patients with diopters from −20 D to +20 D can have their refraction compensated, allowing the capture of high-quality exams throughout this range of diopters. The distance d' can vary from 10 to 50 mm, 26 mm being the preferred value.

Figure 4:
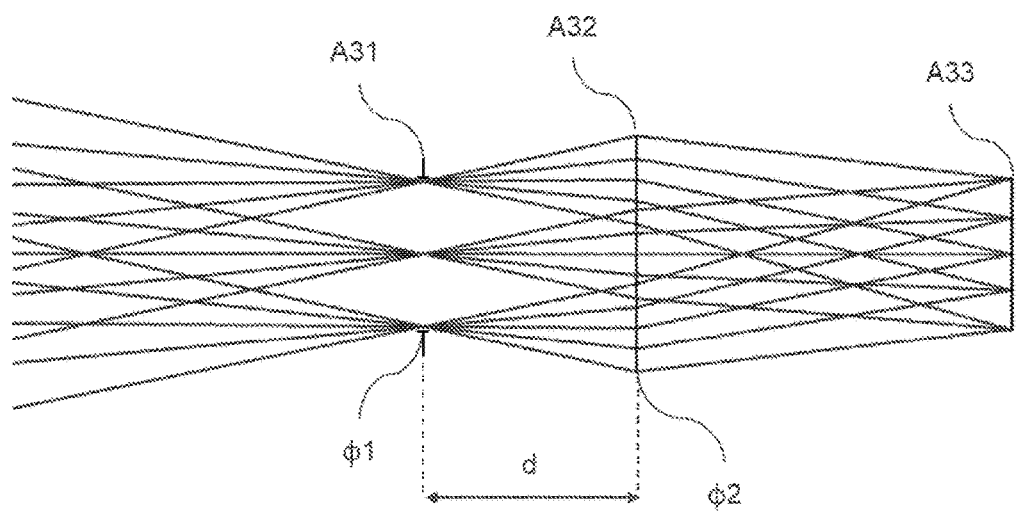
FIG. 4 depicts the ray tracing of retinal imaging in the region of the optical aperture located near the entrance pupil of the camera.

For different types of cameras to be useable in the proposed optical set without changing the imaging ray tracing, the optical aperture A31 is used, as shown in FIG. 4, positioned at a short distance d before the entrance pupil of the camera A33, having a diameter φ1, slightly shorter in relation to the aperture diameter of the camera φ2, as shown in FIG. 4. Therefore, the imaging ray tracing does not depend on the aperture diameter of the camera, whether from the external device or external camera, but from the aperture defined in the optical set. The distance d is approximately 2.5 mm and the aperture has a diameter of approximately 2 mm, which may vary according to the embodiment, while the diameter of wide-field cameras is approximately 3 mm, since cameras with Fnumber=1.5 are common, and the focal length of wide-field cameras is approximately 4.5 mm. Cameras with increasingly larger apertures, mainly for a greater capture of light are a notable market trend. So, the proposed type of aperture protects the proposed optical set from optical variations of widefield cameras that can be used as well. In the worst case, if the camera has an aperture shorter than 3 mm, vignetting of the rays that reach the edge of the entrance pupil of the camera, A32, may occur, darkening the edges of the images captured. However, this non-uniformity of illumination in the image sensor can be easily corrected with image processing, by applying, for example, a filter that increases the brightness at the edges of the image. It is worth mentioning that the proposed optical aperture allows the device for ocular imaging to work properly with a wide range of cameras present in mobile devices, such as smartphones and tablets, without requiring changes in the proposed optical system.

The optical set proposed in FIG. 3 can be separated into two: a subset responsible for forming the intermediate and telecentric image of the retina in the plane of the mechanical iris (c1) and a subset that projects the intermediate image to be captured by the camera (c2). As the diameter of the imaging beam resulting from a point object in the retinal plane must be of the order of 1 mm in the plane of the cornea, mainly to reduce ocular optical aberrations and to allow non-mydriatic operation, and the diameter of the optical aperture must be of the order of 2 mm as described previously, these are conditions which restrict and relate the focal length of subsets c1 and c2, such that:

$$1,0 \leq \frac{F_2}{F_1} \leq 3,0$$

where $F_2$ is the effective focal length (EFL) of c2 and $F_1$ is the EFL of c1. For the embodiment being presented $F_2=2F_1$.

Figure 5:
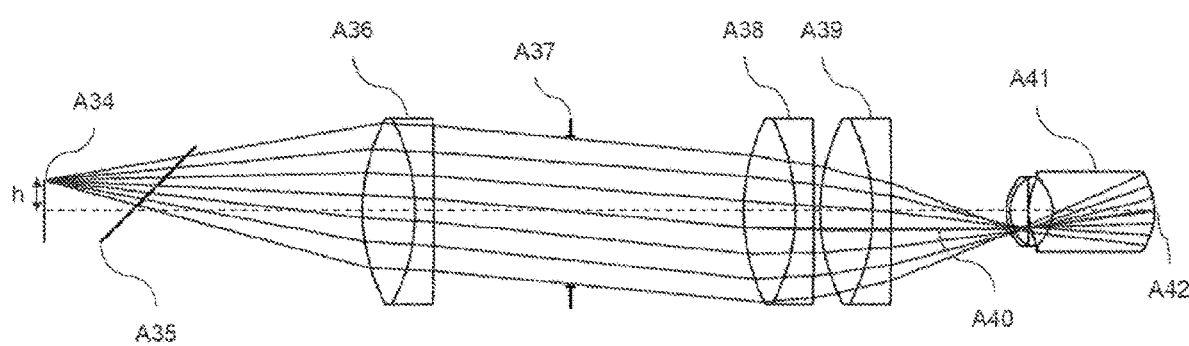
FIG. 5 shows the optical layout for the retinal illumination ray tracing.

Still for the same embodiment, FIG. 5 depicts the detail of the ray tracing for the illumination of the retina. The light source A34 is positioned at a height h from the optical axis and above the optical aperture for retinal imaging, A28 shown in FIG. 3, and the ray tracing passes through the beam splitter A35, the doublet A36, reaching in sequence the mechanical iris A37, which also functions as an optical aperture that restricts the diameter of the illumination beam. The doublets A38 and A39 focus the beam, forming a small spot of illumination in the cornea of the patient's eye, A41. The beam then diverges and reaches the retina, illuminating it homogeneously throughout the field of view observed. As a consequence of the telecentricity imposed for the intermediate image of the retina, for the illumination ray tracing it follows that the telecentricity of the beam occurs when the beam exit the optical system, as shown in the parallelism of the illumination chief ray, A40, in relation to the optical axis in FIG. 5. This telecentricity ensures that the observed field of view of the retina is homogeneously illuminated using only one light source, as seen in A42, where the chief ray of the illumination reaches the retina on the optical axis.

Adjustment of the height h of the light source in relation to the optical axis is very important to prevent the lighting from causing unwanted artifacts to the retinal imaging but, at the same time, allows non-mydriatic operation. The height h can vary from 3 to 10 mm, with 7 mm being the preferred value.

The optical set allows illumination in the visible and infrared spectrum without the need of a specific optical path for illumination, avoiding specific optical components for the illumination such as lenses, prisms, mirrors, beam splitters and dichroic filters.

Figure 6:
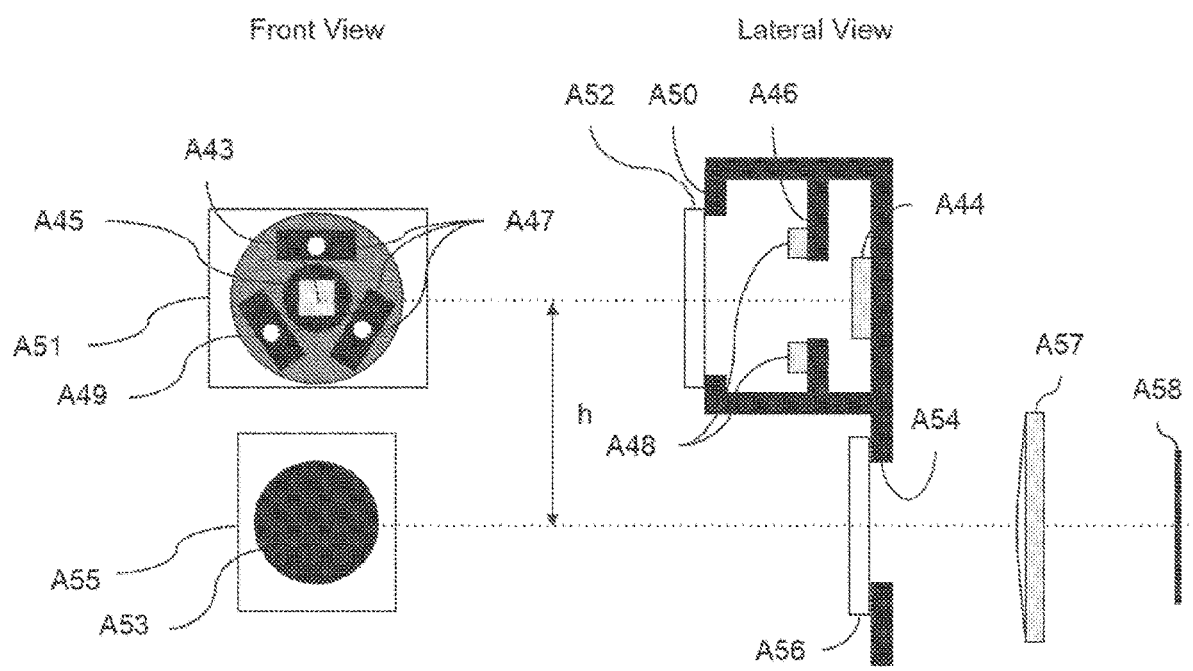
FIG. 6 depicts the proposed lighting module for the optical set.

FIG. 6 shows a compact lighting module composed by a light emitting diode in the visible spectrum, represented in A43 and A44, an internal baffle, represented in A45 and A46, three light emitting diodes in the infrared spectrum, represented in A47 and A48, positioned just after the internal baffle along with its emitting centers, A47, close to the emitting center of the light emitting diode in the visible spectrum, A43, an external baffle, represented in A49 and A50, and a linear polarizer with high efficiency for the visible and near infrared spectrum, represented in A51 and A52. The aperture of the optical system, represented in A53 and A54, coincides with the plane of the light emitting diode in the visible spectrum and has a high efficiency linear polarizer for the visible and near infrared spectrum, represented in A55 and A56, with its polarization axis rotated 90 degrees in relation to the illumination polarizer represented in A51 and A52. The linear polarizers arranged in this way allow the elimination of optical artifacts generated by the reflection of the lighting in the optical interfaces of the lenses common to the illumination and imaging of the retina and that reach the objective lens of the camera, A57, and the image sensor A58.

As the lighting module and its components are highly compact, infrared lighting follows practically the same path as visible lighting, thus eliminating the need for dichroic filters and an exclusive optical path for lighting, making the proposed optical set more compact and at a lower cost.

It is important to note that for the radiation in the infrared spectrum to be captured by the camera the image sensor should be sensitive to this spectral region and that optical filters that block this radiation cannot be used.

Another characteristic of this set is the presence of internal fixation targets, which help carrying out retinal exams. The targets are projected on the retina of the patient and pass through the center of the pupil of the patient at the right position for the capture.

Figure 7:
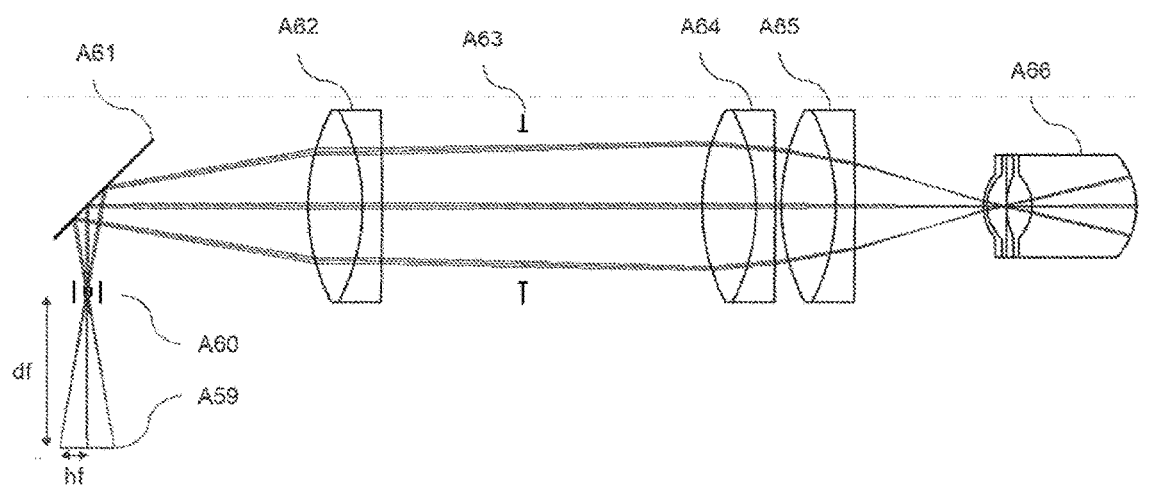
FIG. 7 depicts the optical layout for the ray tracing of the internal fixation points.
Figure 8:
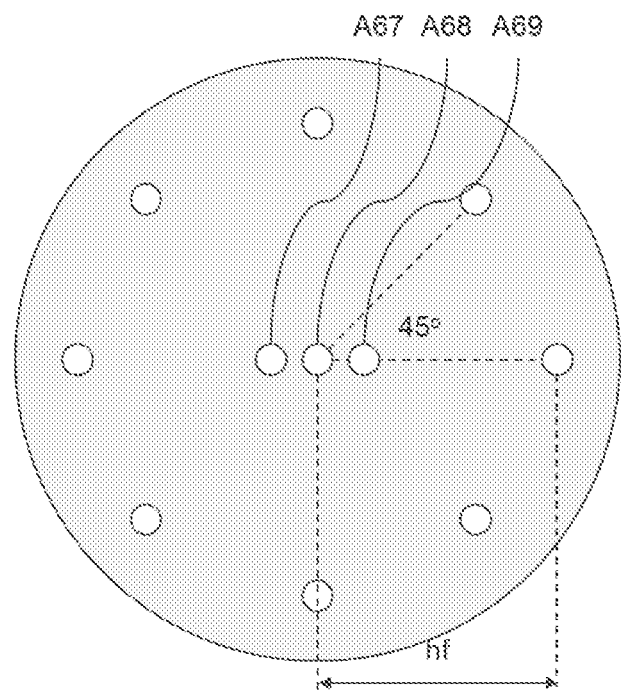
FIG. 8 depicts the embodiment for the 11 internal fixation targets.
Figure 9:
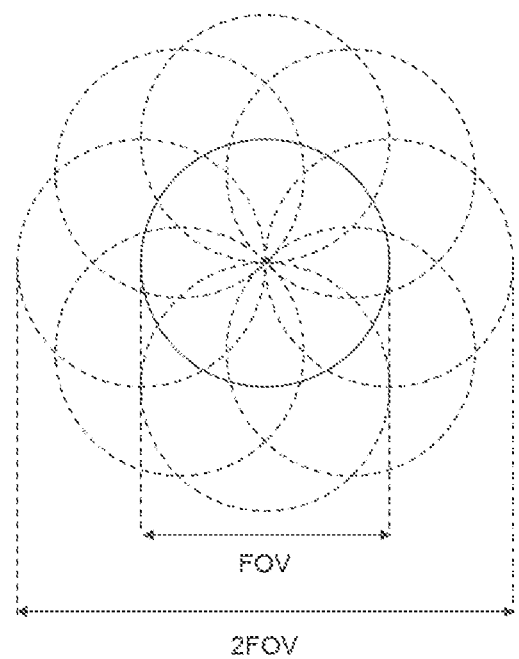
FIG. 9 depicts the principle of retinal mapping with 8 external fixation targets and a central fixation target.
Figure 10:
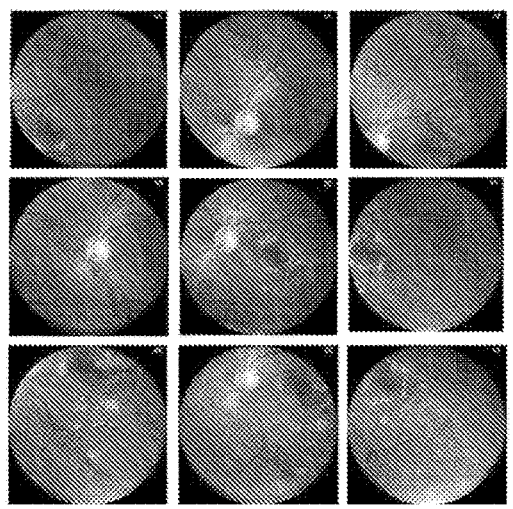
FIG. 10 provides (a) an example of retinal images obtained with the proposed optical set in its first embodiment and (b) an example of panoramic image resulting from the set of images presented in (a).
Figure 10:
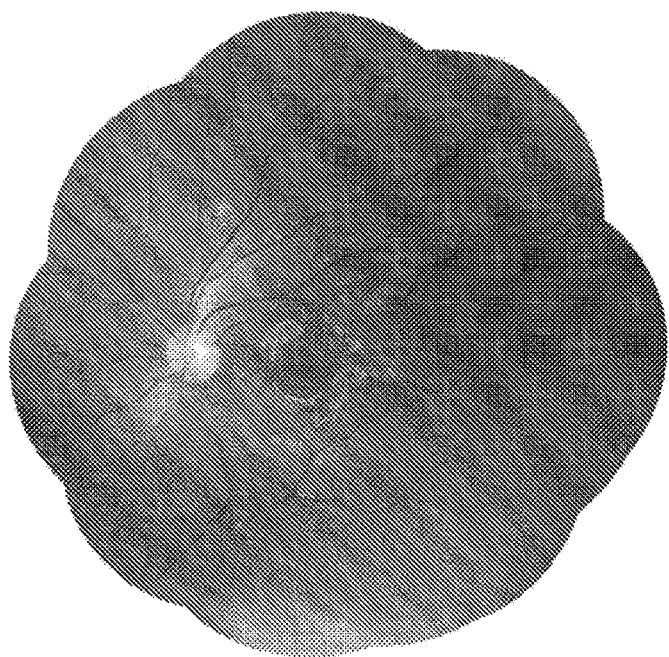

FIG. 7 shows the light ray tracing from the lighting sources A59 for internal fixation, which can be light emitting diodes or even from a micro-display, which pass through a pinhole, A60, with diameter ϕf and positioned at a distance df of the sources. The beams pass through the pinhole and enter in the main optical path by reflection in the beam splitter A61, pass through the lenses of the optical assembly, A62, A64 and A65, and reach the eye of the patient, A66, passing through the center of the pupil, finally reaching the retina. Thus, by adjusting the distance df and height hf, which is the distance between the central fixation target and the most external fixation target, the angle at which the fixation targets are projected on the retina may vary, and this angle is limited to the device field of view (FOV). The value of df can vary from 15 to 45 mm, with 27 mm being the preferred value, and the value of hf can vary from 2 to 8 mm, with 5 mm being the preferred value. Thus, using nine internal fixation targets (central target plus eight fixation targets in the edges, arranged at an angle of 45 degrees in relation to the central point as shown in FIG. 8), it is possible to observe the retina with a total field of view up to two times larger than the instantaneous field of view, as shown in FIG. 9. Once the images are captured for each of the fixation targets, it is possible to create a single panoramic image of the retina, also known as retina mosaic, as shown in FIG. 10.

In addition to the 8 fixation targets used to observe the periphery of the retina and the central fixation point, in which the macula of the patient is positioned in the center of the image, two auxiliary fixation targets located on the x-axis, A67 and A69, are used close to the central fixation target A68, as shown in FIG. 8. These two additional fixation targets can be used alternately for the right and left eyes, moving the position of the macula to the temporal direction so that both the macula and the optic nerve, which are the most important structures of the eye fundus, can be recorded in a single photo, even for optical sets with a reduced field of view of 30 degrees, for example.

Figure 11:
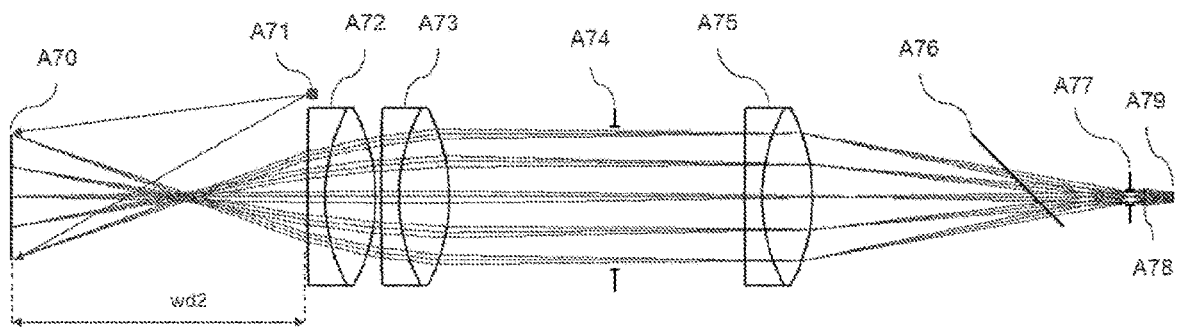
FIG. 11 depicts an optical layout of the embodiment for anterior segment imaging without additional lens.

The proposed optical set also allows taking pictures of the anterior segment of the eye in two ways. In the first one, the eye of the patient is positioned at a distance wd2 from the optical set, as shown in FIG. 11, which can vary from 30 to 100 mm, with 60 mm being the preferred value, and the focal position of the camera is adjusted to the macro position, so that the object plane coincides with the cornea plane, A70. For any focal error, the autofocus mechanism of the camera can be used for correction. As a consequence of the focus adjustment for this working distance, the intermediate image is formed close or in the interior of the doublet A75.

Figure 12:
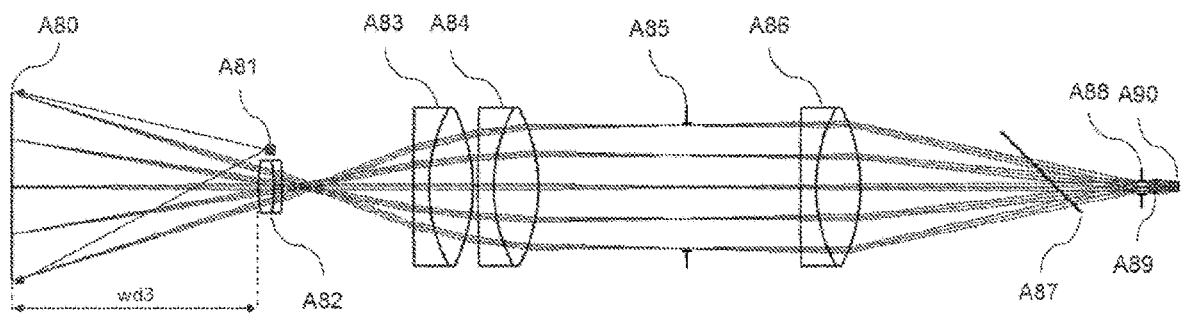
FIG. 12 depicts an optical layout of the embodiment for anterior segment imaging with additional lens.

The second embodiment for capturing images of the anterior segment of the eye makes use of an additional positive lens, A82, as shown in FIG. 12, which can be an achromatic doublet or a singlet lens, with a diameter from 10 to 30 mm, 15 mm being the preferred value, and a focal length from 30 to 100 mm, with 60 mm being the preferred value, positioned before the entrance pupil of the system, as shown in FIG. 12. The cornea plane, A80, is positioned at a distance wd3, which coincides with the back focal length of the lens A82.

For both cases, the light source used in the capture can be internal, in this case the same light source used to illuminate the retina, A34 shown in FIG. 5, or an external light source, A71 and A81 shown in FIGS. 11 and 12, where the ray tracing for the external light sources that enable imaging of the anterior segment of the eye are also depicted.

Hereinafter, other embodiments will be presented for the optical set, where the ray tracing for retinal imaging will be detailed, although the same concepts previously presented for the ray tracing for retinal illumination, internal fixation points and anterior segment imaging remain valid.

Figure 13:
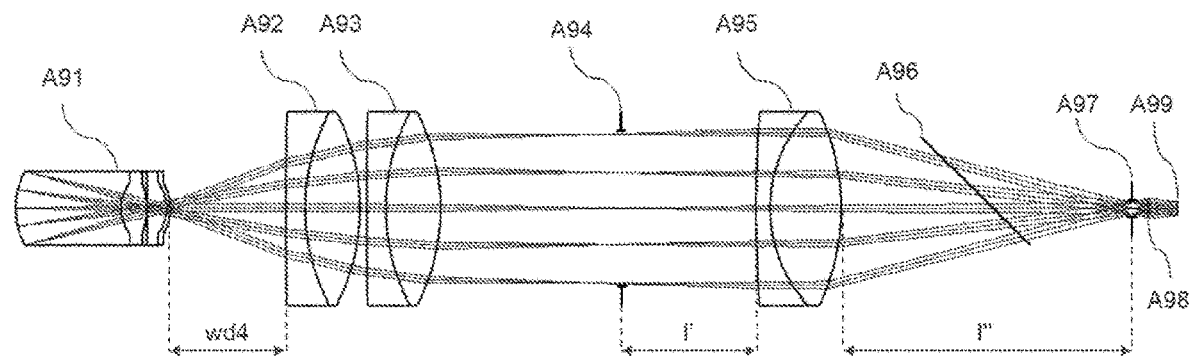
FIG. 13 depicts an optical layout for the retinal imaging ray tracing for the second embodiment of the proposed optical module.

The second preferred embodiment for the optical set is presented for the case where F2/F1=1.67, shown in FIG. 13. In this case, the doublet A95 has a focal length 20% shorter than the doublet A26 presented in the first embodiment shown in FIG. 3, and its diameter is kept the same as the component A26. All other optical components are the same presented in the first embodiment. The optical set in this case becomes more compact and the resolution of the images increases by 20% compared to the first embodiment, keeping the same instantaneous FOV of 45 degrees. The distances l', l" and wd4 need to be reduced by a 20% factor in relation to their equivalent distances presented in the first embodiment. As the magnification ratio of the optical set has decreased by a factor of 20% compared to the first embodiment, the diameter of the aperture A97 and the height h for the lighting module detailed in FIG. 6 need to be decreased in the same proportion to keep the performance of illumination and imaging.

Figure 14:
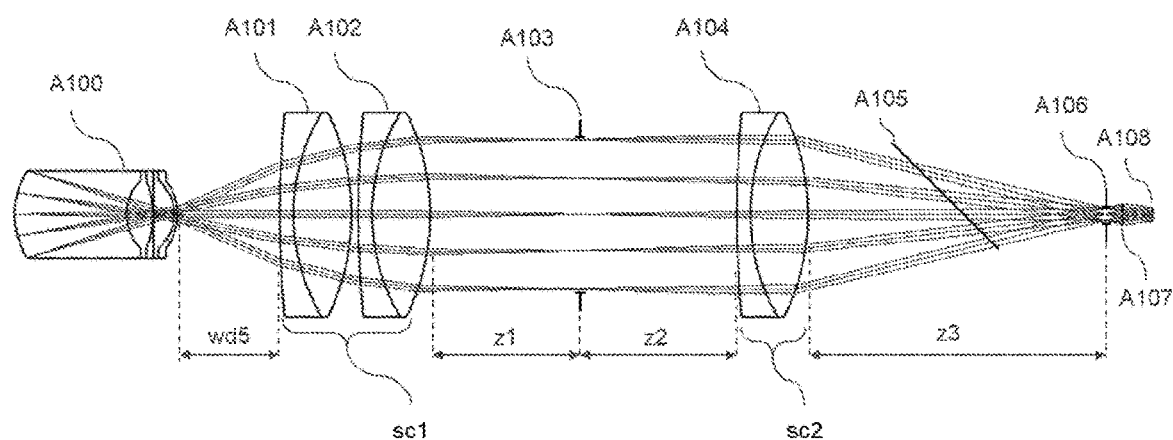
FIG. 14 depicts an optical layout for the retinal imaging ray tracing for the third embodiment of the proposed optical module.

The third preferred embodiment for the optical set maintains the ratio F2/F1=2, as in the first embodiment, however in this case the effective focal length of subset 1, sc1, and of subset 2, sc2, are both decreased by a factor of 20% compared to the first embodiment, keeping the same value for the diameter of these components. As a consequence, the optical module reaches an instantaneous field of view 20% larger than the first embodiment. The working distance wd5, z1, z2 and z3 are reduced by a factor of 20% in relation to the first embodiment, making the optical set even more compact, as shown in FIG. 14.

Figure 15:
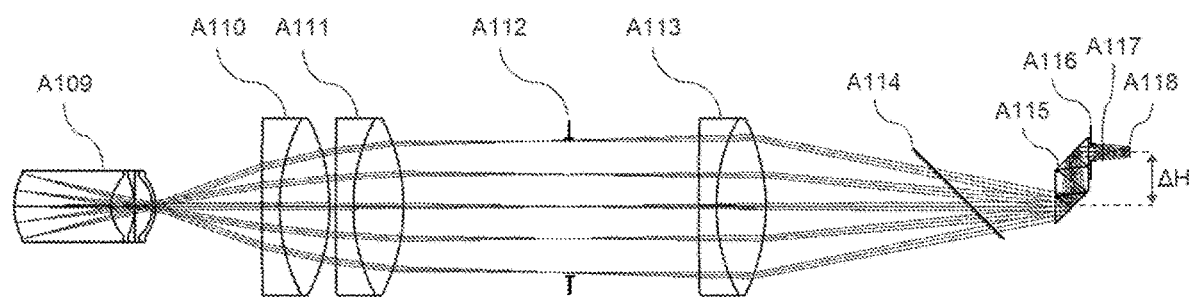
FIG. 15 depicts an optical layout for the retinal imaging ray tracing for the fourth embodiment of the proposed optical module, where a rhomboid prism is introduced to laterally shift the optical aperture in relation to the optical axis.

As furtherly detailed, the device has a specific ergonomic and functional design. For cases in which the proposed device uses the wide-field camera present in mobile devices, such as smartphones or tablets, a factor that may impair its design is the location of the wide-field camera on the back of the external device. Rear cameras positioned in the center and at the top of the external devices favor the proposed design. For models that have asymmetrical rear cameras, as for example positioned in the upper left corner, it is presented a new way of solving this asymmetry while maintaining the same design as well as the same architecture and components presented in the first embodiment, introducing only a rhomboid prism, A115, positioned immediately before the aperture of the optical set, A116, as shown in FIG. 15. The prism keeps the same ray tracing for imaging the retina shown in the first embodiment, apart that the optical aperture of the proposed set and the camera has an offset of ΔH from the optical axis where the doublets A110, A111 and A113 are inserted, as well as the mechanical iris A112, beam splitter A114 used for internal fixation and the patient's eye, A109. The displacement factor generated by the rhomboid prism, ΔH, can be changed since it is a constructive parameter of this type of optical component that is already well known in the state of the art.

Design of the Proposed Device

Figure 16:
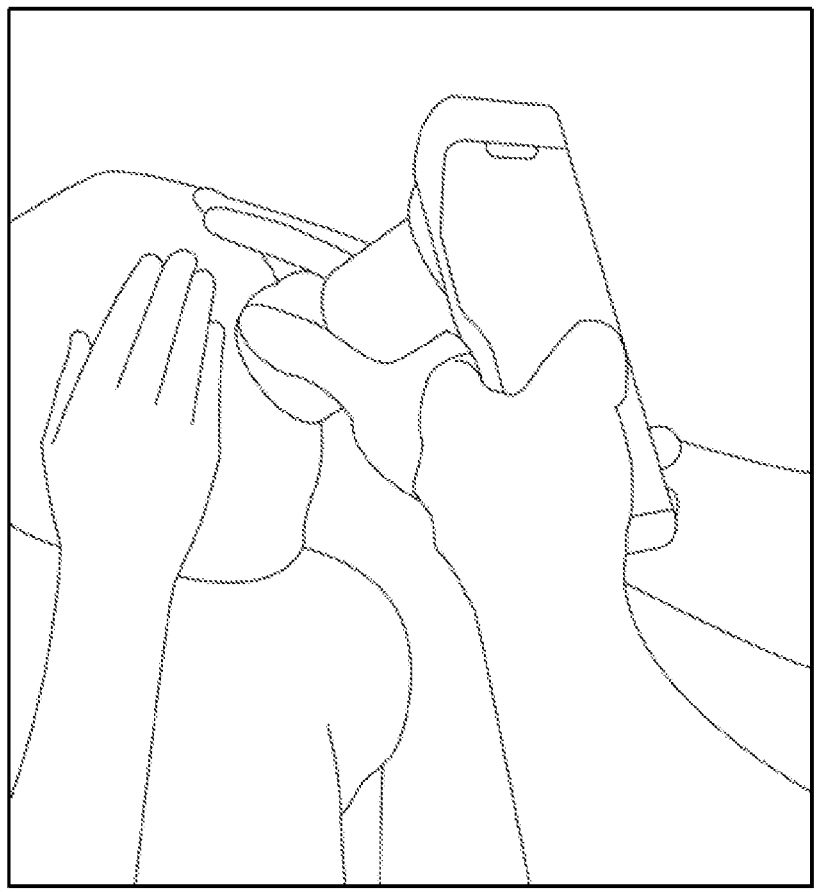
FIG. 16 describes the proposed way of holding the device to carry out retinal exams.

The ergonomic and functional design, as well as the mechanics of the device, assists the operator generate high quality retinal exams in a simple way. Its grip is designed for both hands, one holding the apparatus on its front, in which there is a support for the fingers, allowing the positioning of the optical system to be captured accurately, and the other positioned on the back of the apparatus, close to the external device, serving the support with the palm of the hand and allowing the user's thumb to click on the touch screen display of the external device to generate commands and perform the exam, which can also be done via voice commands, or even autonomously after checking standards in the preview, eliminating the use of one hand to capture the image. FIG. 16 shows the proposed way of holding the device to perform retinal exams.

FIG. 17A-D shows an embodiment of the present invention, prepared to be integrated with an external mobile apparatus.

Figure 17:
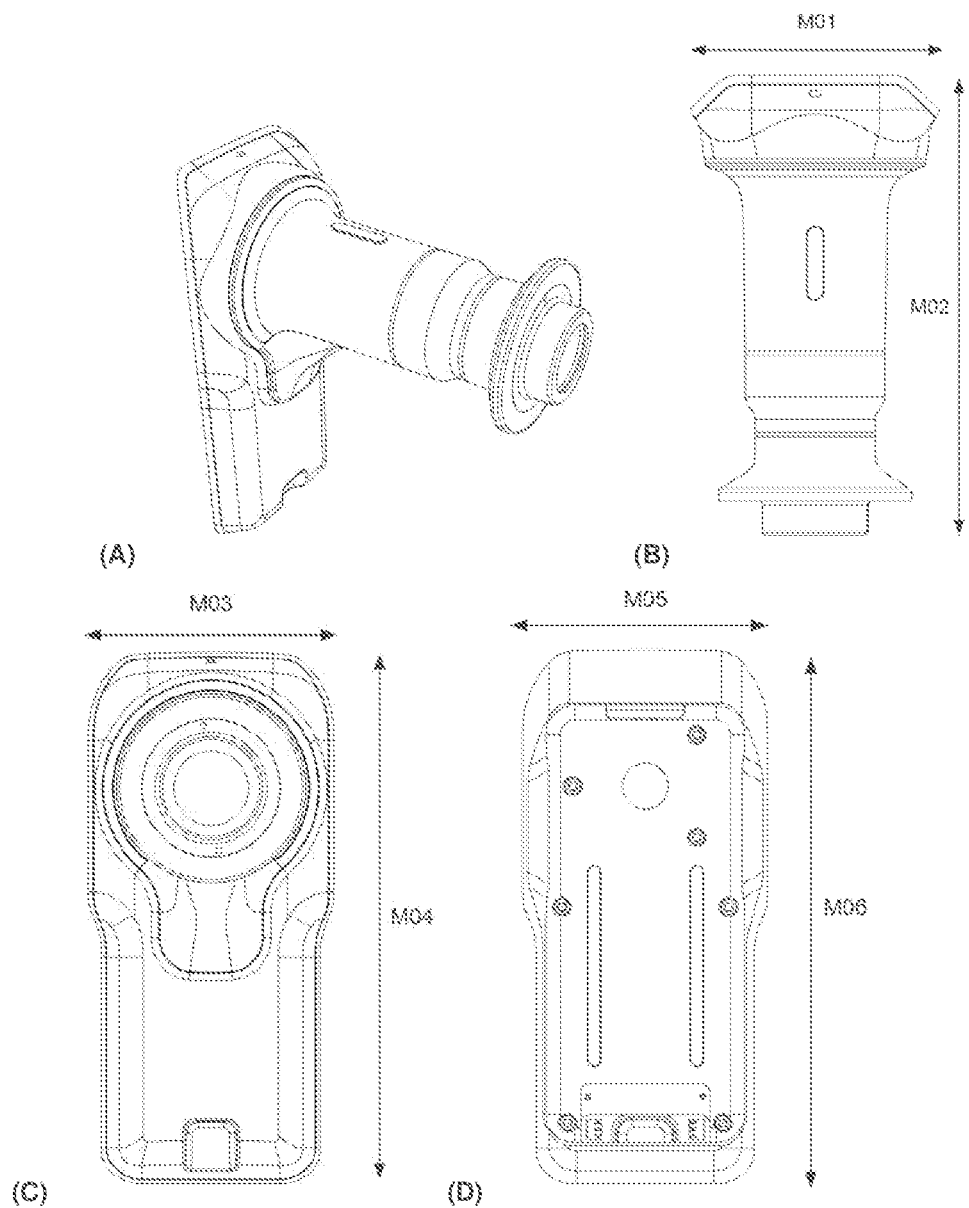
FIG. 17A shows the opposite part of the mobile device touch screen, as well as the optical set and the ergonomic design for holding the device.
FIG. 17B shows the top view of the optical set and its mechanical structure.
FIG. 17C depicts the front view, as the patient sees the device, showing the front of the optical set and its lenses.
FIG. 17D depicts where the external device can be attached to capture images.

FIG. 17A shows the opposite part of the mobile device touch screen, as well as the optical set and the ergonomic design for holding the device. A tapered piece is placed at the end of the optical set to guide the correct positioning of the user's hand, offering firmness and precision during the examination. The operator holds the equipment by placing one hand on the front, rightwards, before the tapered piece, and the other hand on the back of the device, leftwards, supporting the device and, at the same time, allowing the use of his/her thumb to touch the screen and send commands during the examination.

FIG. 17B shows the top view of the optical set and its mechanical structure, the M01 measurement is approximately 85 mm and the M02 measurement is approximately 155 mm.

In 17C, the front view is displayed, as the patient sees the device, showing the front of the optical set and its lenses, where the M03 measurement is approximately 85 mm and the M04 measurement is approximately 185 mm.

FIG. 17D shows where the external device can be attached to capture images, where M05 measures approximately 85 mm and the M06 measures approximately 185 mm. The external device camera must be centered in the core circle for correct imaging.

It is worth mentioning that, if the camera of the external device is used and it is not centered on the optical axis of the proposed apparatus, the support piece of the external device, shown in FIG. 17D, can be set in its x and y dimensions, thus allowing the correct alignment of the camera to the optical axis. This part works as a cover or centralizing support for the external device to be integrated and can be changed, according to the model of the external device used.

The ergonomic and functional design of the front of the device includes a deformable plastic part (eyecap) that makes contact with the face of the patient during the examination and is adaptable to the shape of the face, especially in the area surrounding the eye. Its material can be biocompatible silicone, for example, which can be sterilized with alcohol before the exam to provide hygiene for the patient.

The eyecap also has several levels of hardness, which can improve the adaptation for each face shape. The eyecap provides the operator a tactile response when the device approaches the eye of the patient in search of the correct examination position, which is approximately 22 mm between the device and the cornea of the patient. In the correct position for an examination, the proposed eyecap provides isolation of the examined eye from the external environment, avoiding any external lighting that may impair the image capture for the examination. Thus, it is possible for the retinal exams to be carried out without pupil dilation, regardless of environmental lighting.

Figure 18:
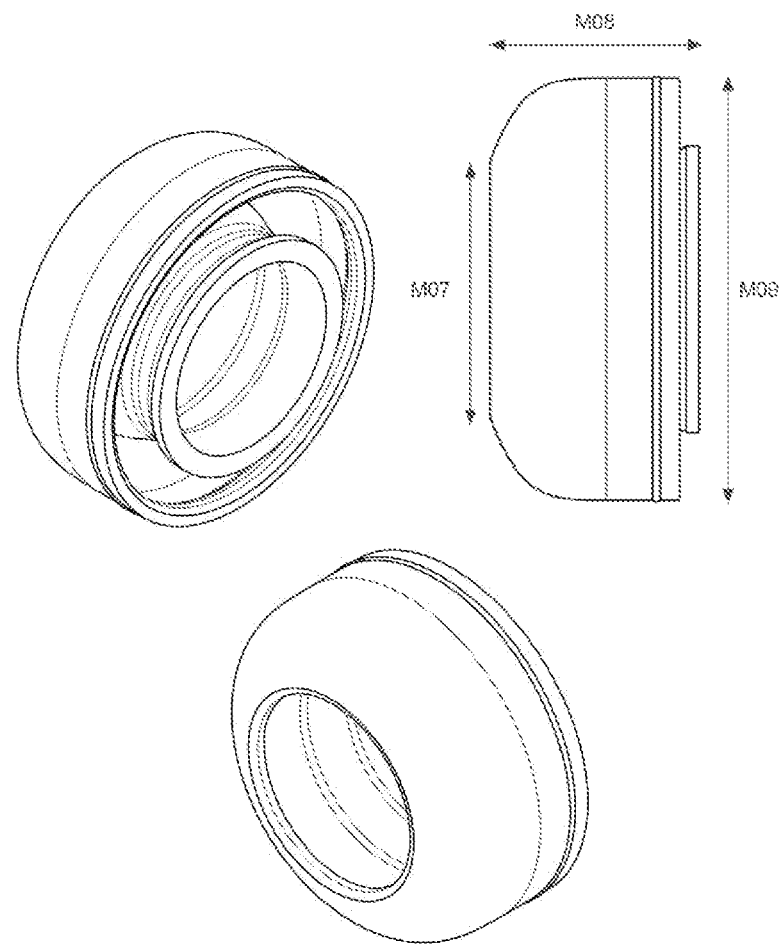
FIG. 18 depicts the embodiment for the eye adapter (eyecap).

FIG. 18 shows a preferred embodiment of this flexible piece, which aims to adapt anatomically to different shapes of faces. As it is a portable and non-mydriatic device, in many situations it is important that the patient is in a dark environment for the exam. As this is not always possible, this flexible piece allows, in addition to the ease of support when carrying out the examination, avoiding physical contact between the equipment and the eye of the patient, and also assuring the examined eye remains in the dark, avoiding entrance of external light. As a natural reaction of the human body, if the patient covers the other eye opposite to the eye being examined, with his hand, the pupils of the patient will naturally dilate, making it even easier to collect the images necessary for the examination. Additionally, M07 dimension is approximately 37 mm, M08 dimension is approximately 32 mm and M09 dimension is approximately 65 mm.

Figure 19:
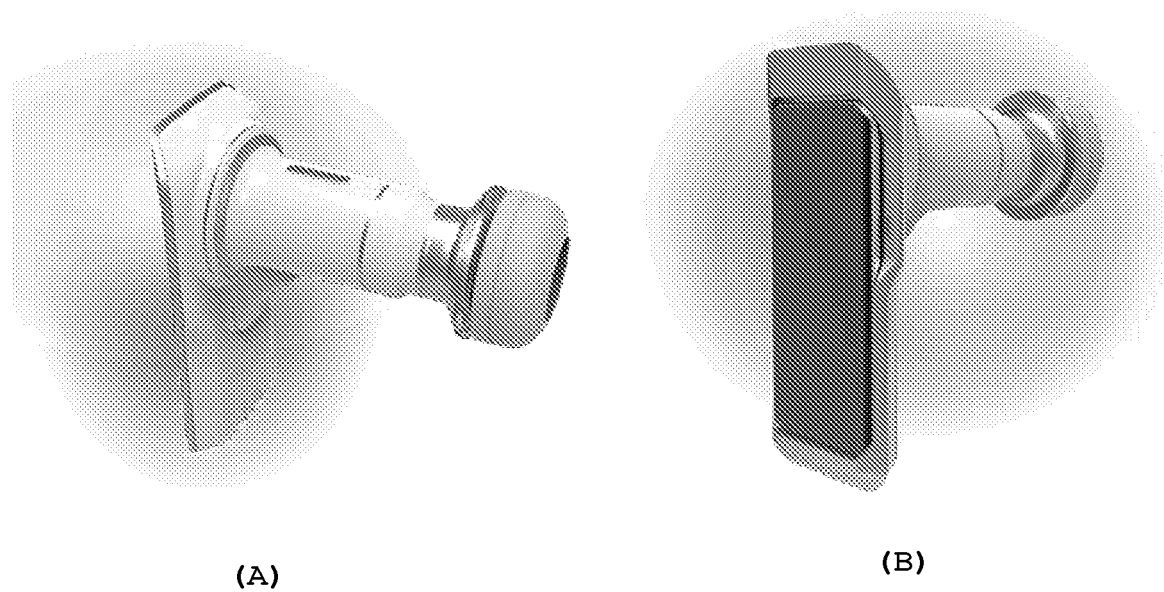
FIG. 19A shows the front of the device with the optical set and the eyecap attached.
FIG. 19B shows an example for an appropriate coupling of the external device to the proposed device.

FIG. 19 shows an embodiment of the deformable plastic part (eyecap) integrated to the proposed device with an external device connected. FIG. 19A shows the front of the device with the optical set and the eyecap attached. FIG. 19B shows an example for an appropriate coupling of the external device to the proposed device, where the rear camera is aligned with the optics of the proposed device for correct imaging.

Figure 20:
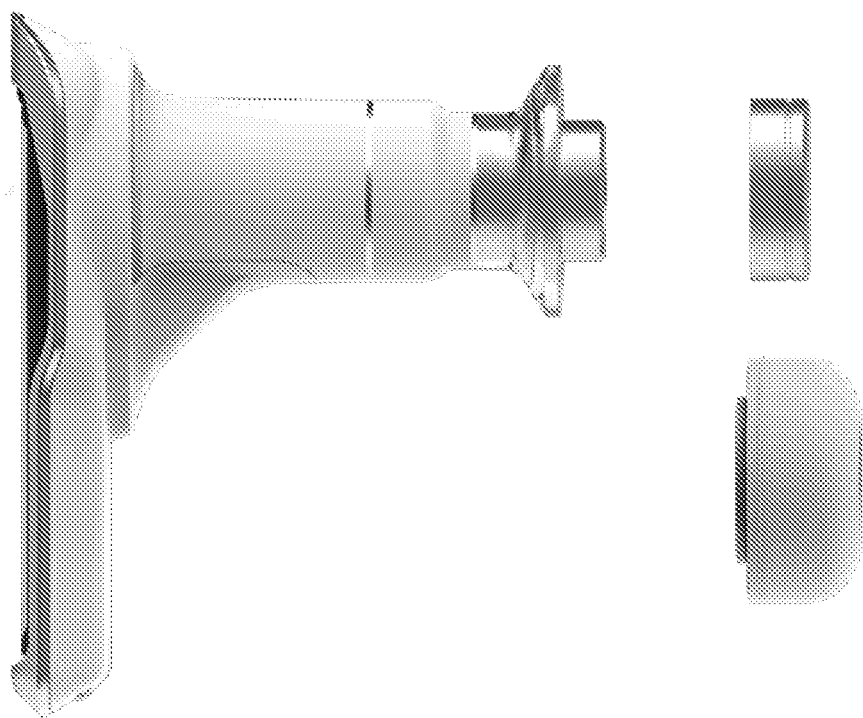
FIG. 20 provides a side view of the embodiment of the invention with an external device connected, protective cover for the optical components and eyecap.

FIG. 20 depicts the implementation of the present invention showing a side view with the eyecap and the lens protective cover, which can be used for transport and avoid damage to the device optical components. In this view it is possible to see that the eyecap design allows it to be easily fitted to the equipment. In many cases, it is still possible to carry out the exam without this piece, whether in a dark environment or with pupil dilation.

Electronic Module of the Proposed Device

The main purpose of the electronic system of the proposed device is to provide the necessary lighting for the examination that, through the optical system, reaches the ocular structures that will be imaged. Lighting activation is done by a series of circuits that properly condition the electrical energy and apply it to the light emitting elements. The system comprises a series of modules with specific functions. For the embodiment in which the external mobile device is a smartphone, the first module receives the electric energy from the smartphone through a physical connection and converts the voltage to adequate levels in order to supply the other modules. The main drive module comprises a current source that controls the intensity of the current that is applied to the light emitting diode in the visible spectrum, in order to generate light pulses with controlled power and duration. Another part of the electronic module controls the intensity of the current that is applied to the set of light-emitting diodes used to illuminate the scene in the infrared spectrum.

The internal fixation system is activated electronically by another part of the module and allows the activation of a microdisplay or a set of light emitting diodes in the visible spectrum in which the patient should fix his gaze during examination.

Finally, the electronic module has the control part, with a microcontroller and a respective programmed software, as well as its controlled peripheral components. It controls and activates the other modules, monitoring their status and possible failures as well as the interaction with the external device. Its functions are activated through communication with the external device and managed by the application. Its main objective is to illuminate the ocular structures with precision at the exact moment the external device is capturing the image that reaches the camera through the optical system.

Each command received from the external device is interpreted by the microcontroller, which generates a set of actions in the electronic system. The general status of the electronic system is periodically informed to the external device to keep the validation of the operation. In addition, the control module is also responsible for storing device information such as encryption keys used in communication and other validations, operation settings, serial number and other information for the respective unit.

Figure 21:
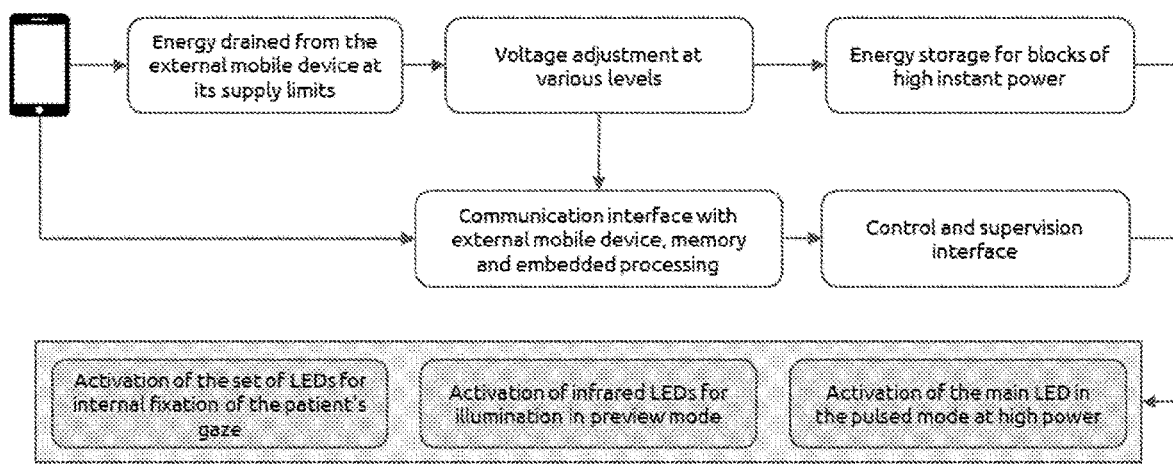
FIG. 21 shows the energy flow to supply the electronic module of the proposed device and to activate the internal LEDs to illuminate the eye.

FIG. 21 shows the energy flow for the embodiment that uses a smartphone as an external device and the use of its own battery to power the electronic module of the proposed device for ocular imaging.

Figure 22:
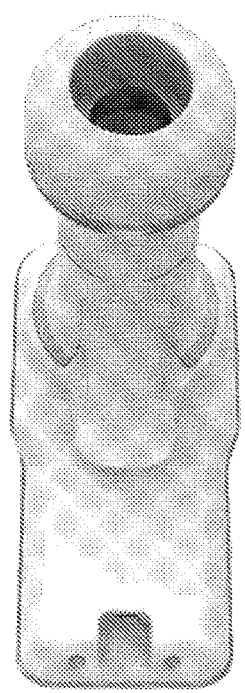
FIG. 22A depicts charging the external device attached to the proposed device by plugging the standard power cable of the external device into the USB connection between the two inferior contact pins.
FIG. 22B depicts charging the external device attached to the proposed device by the contact of the two inferior pins with the electrical contacts present in its dock station.
Figure 22:
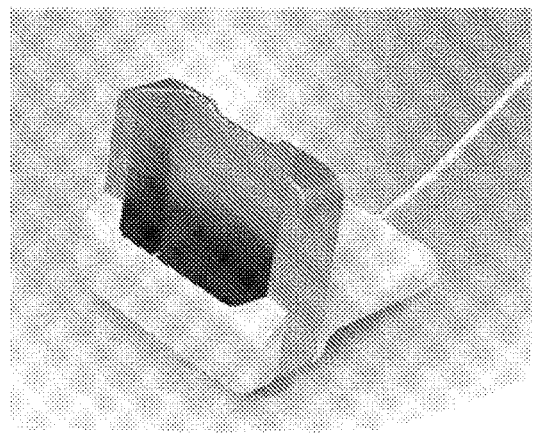

One of the great differentials of the present invention is its high level of compaction that allows a simple, light and highly integrated device. In this sense, the battery is a critical point. One of the achievements of the present invention is related to the use of an external mobile device, as a smartphone, and its battery to power the electronics and lighting system, further increasing the level of compactness. In this scenario, the system is ready for use by simply charging the battery of the external device. Some implementations allow the charging cable of the external device to be connected directly to the equipment in order to recharge, as in the central part of FIG. 22A, or with auxiliary pins on an external charging base (dock charger), as shown in FIG. 22B.

Figure 23:
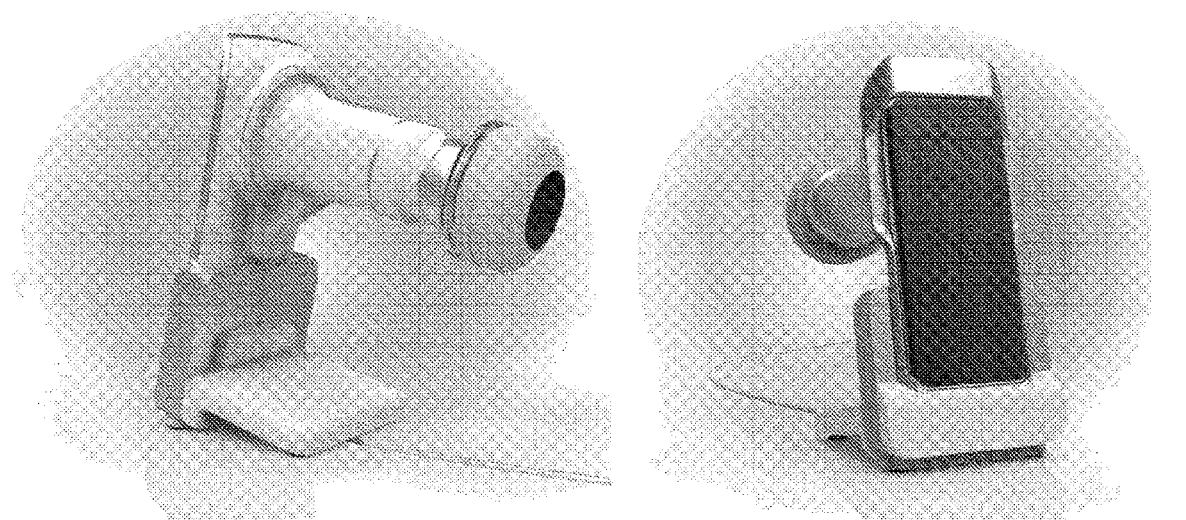
FIG. 23 depicts an embodiment of the proposed device with the external device attached and connected to its dock station.

FIG. 23 shows an implementation of the system in its dock station that allows battery charge and is also useful to facilitate viewing exams on the integrated screen of the external device.

Cloud and Embedded Computing Module

The computational module allows the user to control the application to capture and catalog patient data and carry out the exam. For that, an embedded software was designed to run on the external mobile device (preferably a smartphone), allowing the correct synchronization for the control messages with the embedded electronics of the proposed device and also the synchronism for capturing the images. Considering the scenario when a smartphone is used as an external mobile device, the software is responsible for communicating with the electronics via cable or wireless, for example via USB-C or Bluetooth protocol, sending the messages so that the LEDs light up at the moment the camera is capturing the image. At that time, the smartphone camera must be set up with specific capturing parameters for imaging the anterior or posterior segment of the human eye. The adjustment of these parameters is sensitive and allows to capture images of the eye with the best possible signal-to-noise ratio. The software also controls the internal fixation targets, which allow peripheral imaging of the retina and, subsequently, the creation of panoramic photos of more than 100 degrees of the fundus. Also, software-hardware integration allows image capture in high dynamic range, or HDR (high dynamic range, as it is known in the state of the art), to capture images with higher definition and reduced noise, which is very important for the visualization of small lesions.

Figure 24:
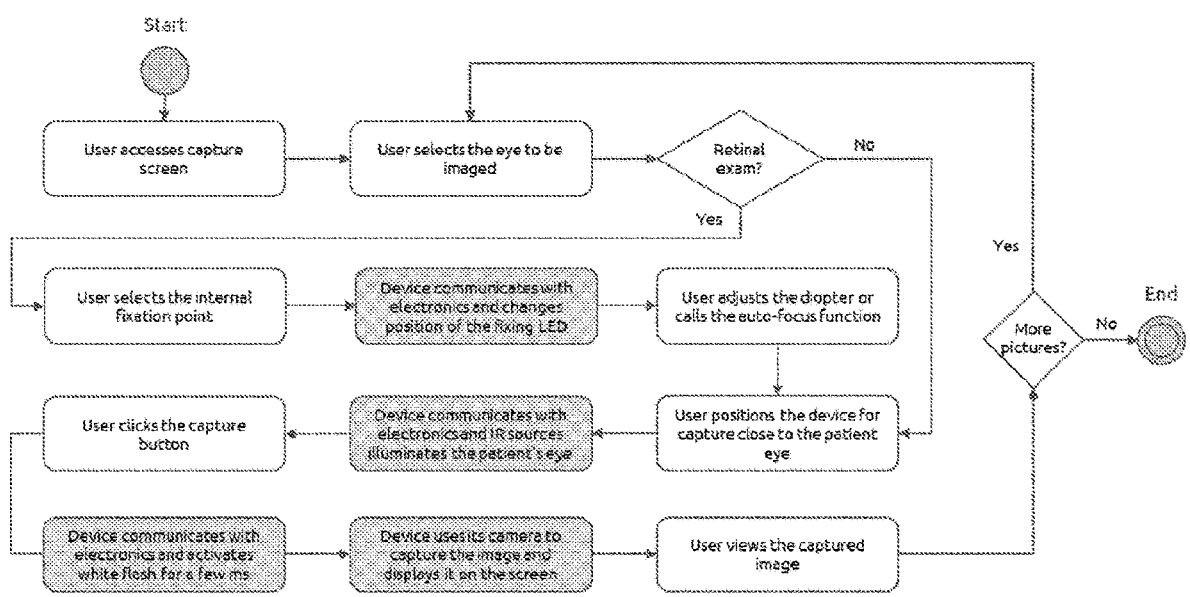
FIG. 24 provides a flowchart with the steps for image capture using the proposed device.

FIG. 24 shows the flow for capturing an image in a possible implementation of the proposed system and method. After entering the application and registering the patient, the operator will access the exam capture screen. Here, the doctor will select whether the patient's right or left eye will be examined, also informing whether it will be a photo of the retina or anterior segment. In the case of a retinal photo, the operator must also select the internal fixation target that will be used, in which the patient will fix his/her gaze during the examination and that allows the imaging of different regions of the retina. After that, the operator adjusts the patient's diopter, manually or using autofocus, and positions the device close to the patient's eye for capture.

In parallel, the smartphone communicates with the device's embedded electronics and turns on the infrared lighting, used in the preview mode for positioning the patient. When the positioning is correct, with the correct visualization of the eye structure to be imaged in infrared, the operator triggers the capture by clicking on the capture button or on the screen.

Right after that, the smartphone communicates with the embedded electronics that turns on a flash in the visible spectrum during approximately 50 milliseconds. Finally, the smartphone uses its camera to capture the image synchronously with the flash and displays the image for the user.

If more photos need to be captured, the process starts again with the choice of the eye; otherwise, the exam is ended. To capture images of the anterior segment, the procedure is the same, but without the need to select the internal fixation point and adjust the focus, simply position the equipment a little further from the eye than when the retinal image was taken.

Due to the diopter of the patient, retinal images may be out of focus if taken at the standard focus position of the device. In this case, the user can use the autofocus feature before capture or even inform the patient's diopter in the device, if he already knows. In the case of autofocus, the device will trigger the autofocus routine embedded in the camera of the smartphone, which, according to the embodiment, can occur either with infrared lighting, which is the default in the positioning mode, or even synchronizing a luminous pulse on the visible spectrum with the autofocus routine. In this case, the luminous pulse has a temporal duration of approximately 500 ms, which is a sufficient time interval for the mechanism to compensate the diopter of the patient, and fast enough so that the patient's pupil is not contracted, in the case of a non-mydriatic exam. In the manual mode, the operator directly informs the diopter of the patient, which speeds up the examination, since the auto-focus step does not need to be performed.

Figure 25:
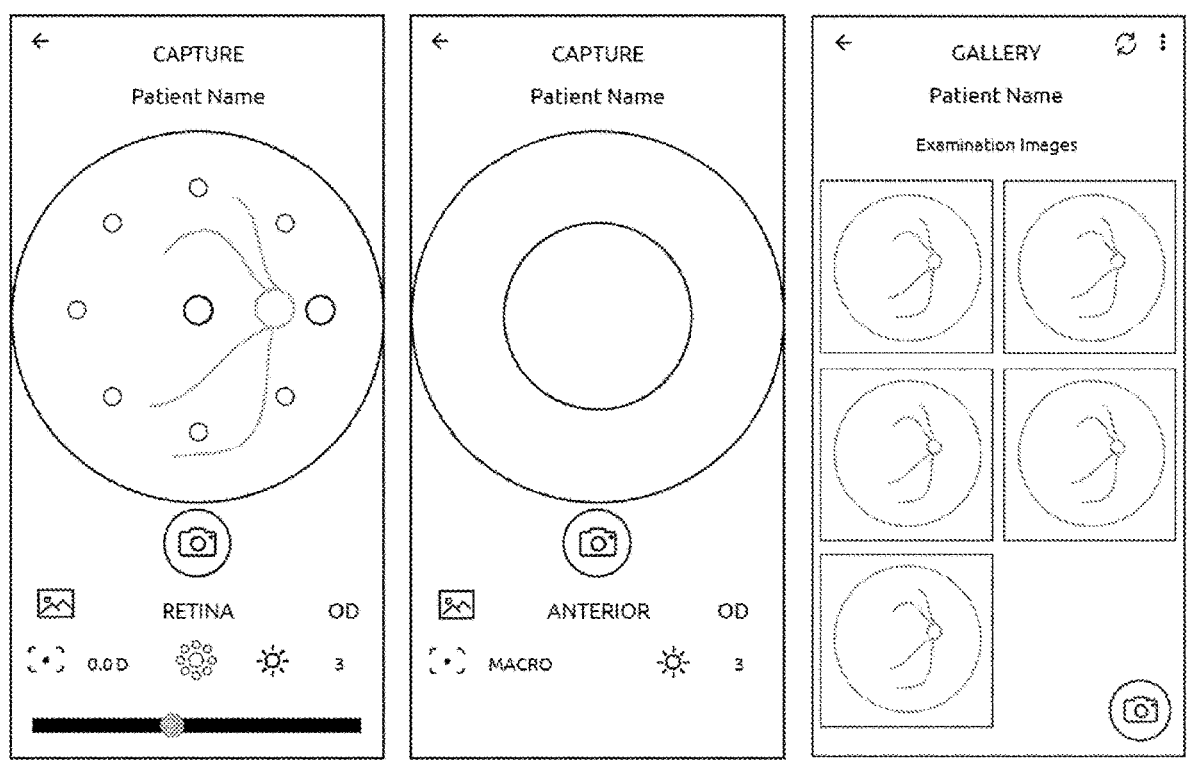
FIG. 25 depicts an embodiment for the screen samples for capturing retinal and anterior segment exams.

For the correct capture and organization of images, an application is necessary for the management of patient data, exams and reports. In this context, FIG. 25 presents an implementation of the capture application of the present invention. An outline of the screen for capturing the images of the posterior or anterior segment of the eye is shown, as well as an example of its image gallery. From these captures, the physician responsible for the examination can analyze the images and give the correct treatment or referral to the examined patient.

Figure 26:
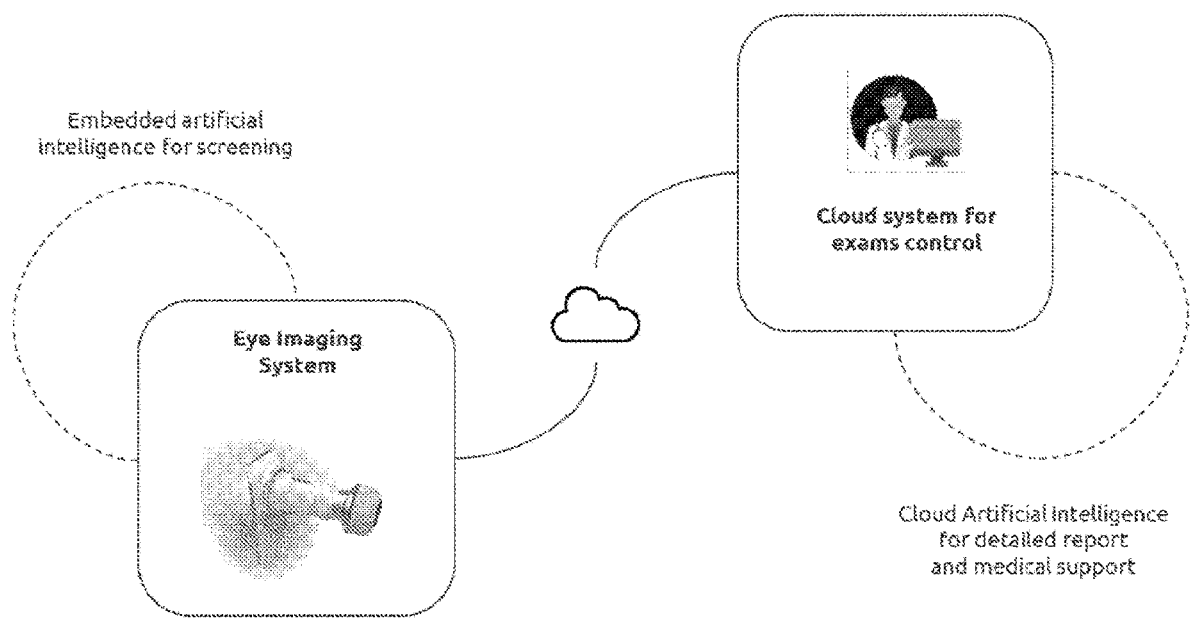
FIG. 26 shows the integration between the application installed on the mobile device and the cloud system for artificial intelligence reporting and telemedicine.

FIG. 26 shows the integration between the embedded software system and the cloud software system. Since the external device used has an internet connection, it allows sending the captured exams to cloud storage. In this scenario, a doctor, even remotely, is able to make the medical report easily and quickly. Another point of the present invention is allowing automatic report for the captured exams by using artificial intelligence (AI) parameters at different levels. The lighter AI models are initially run on the embedded device, with less processing and less battery consumption, which enables patient screening even while operating the device without internet connection. If any lesion is detected the exam should be sent to the cloud and a heavier algorithm with deeper artificial neural networks, now running on more powerful processors, is used to detail the lesion detected.

For example, in diabetic retinopathy screenings, the AI model running on the external device indicates whether the image presents lesions or not and forwards the exam to remote processing in the cloud. On the cloud server, the exam is analyzed by a new, more robust AI model, which detects the level of diabetic retinopathy—absent, mild, moderate, severe or proliferative—and whether the patient has diabetic maculopathy or not, which is a complication that greatly affects the central vision of diabetic patients. In this scenario, the data processed in the cloud complements the embedded processed data and helps in the screening of eye diseases.

Complete reports can be prepared in the cloud system in three ways: 1) automated, with only the computer analyzing and generating a report model automatically; 2) semi-automated, in which the remote computer analyzes and highlights characteristics and delivers a probability of the injury, leaving the physician as the responsible for the medical report; 3) manual, in which the doctor analyzes the image and indicates the lesion detected.

Another possibility of the present invention that guarantees image quality is capturing with high dynamic range (HDR) for the retinal imaging. In this case, taking advantage of burst functions or continuous captures already implemented in mobile devices such as the smartphone, it is possible to capture several successive frames by varying the power of the flash or camera configuration, which will result in darker (lower power) and lighter (higher power) frames, allowing to generate a final image with greater dynamic range and less noise, thus avoiding saturated regions, both too dark and too light.

For retinal analysis this is very important, especially for diagnosing glaucoma, avoiding saturation of the optic nerve head and giving more details about the cup-disc ratio.

Figure 27:
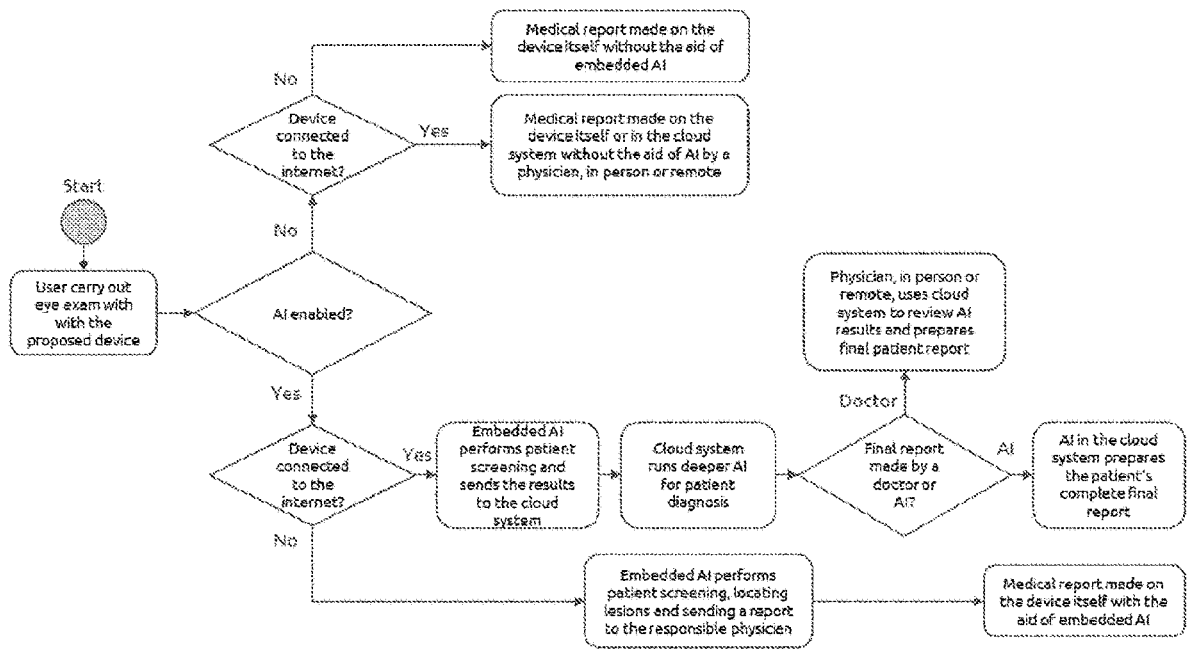
FIG. 27 describes the steps for providing a medical report when the device for carrying out the exam is connected to the internet or not.

FIG. 27 describes the steps for providing a medical report when the device for carrying out the exam is connected to the internet or not.

More specifically, by the moment the exam begins, and the AI is not enabled, the following steps are performed:

I) if the device is not connected to the internet, the medical report is made on the device itself without the aid of embedded AI;

II) if the device is connected to the internet the medical report is made on the device itself or in the cloud system without the aid of AI by a physician, in person or remotely;

In case the AI is enabled, the following steps proceeds:

I) if the device is connected to the internet:

a) performing, by the lightweight onboard AI, patient screening and sending the results to the cloud system;

b) running deeper AI models for patient diagnosis at the cloud system;

c) AI in the cloud system preparing the patient's complete final report, indicating the specific diseases and levels of lesions;

II) if the device is not connected to the internet:

a) performing, by the embedded AI, patient screening, locating lesions and sending a report to the responsible physician; wherein the medical report is made on the device itself with the aid of the embedded AI.

Figure 28:
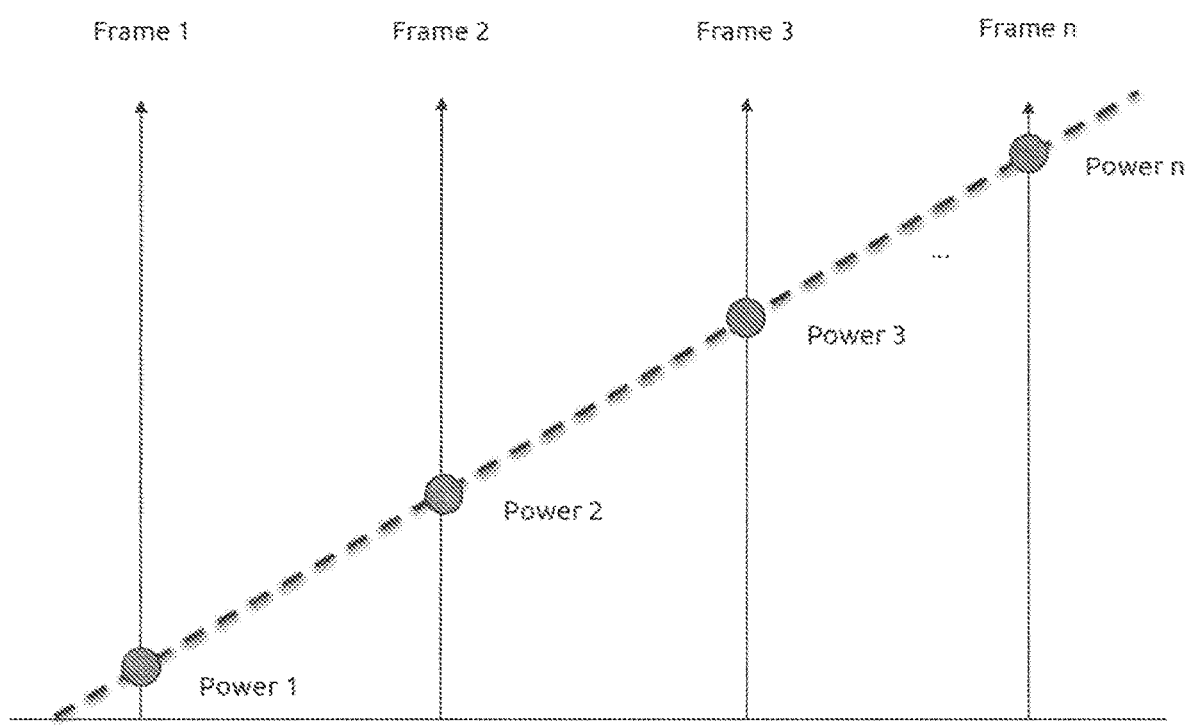
FIG. 28 shows the process to generate HDR image by varying the lighting power or camera configuration during the capturing a sequence of photos.

FIG. 28 shows the process to obtain an HDR image increasing illumination light power during the sequence of capture.

Another embodiment for capturing HDR images is instead of varying the lighting power over time, varying the ISO or exposure of the camera between successive frames. This also allows the generation of a high quality HDR image, however the image generated by varying the intensity of illumination light generates a final image with less noise.

Figure 29:
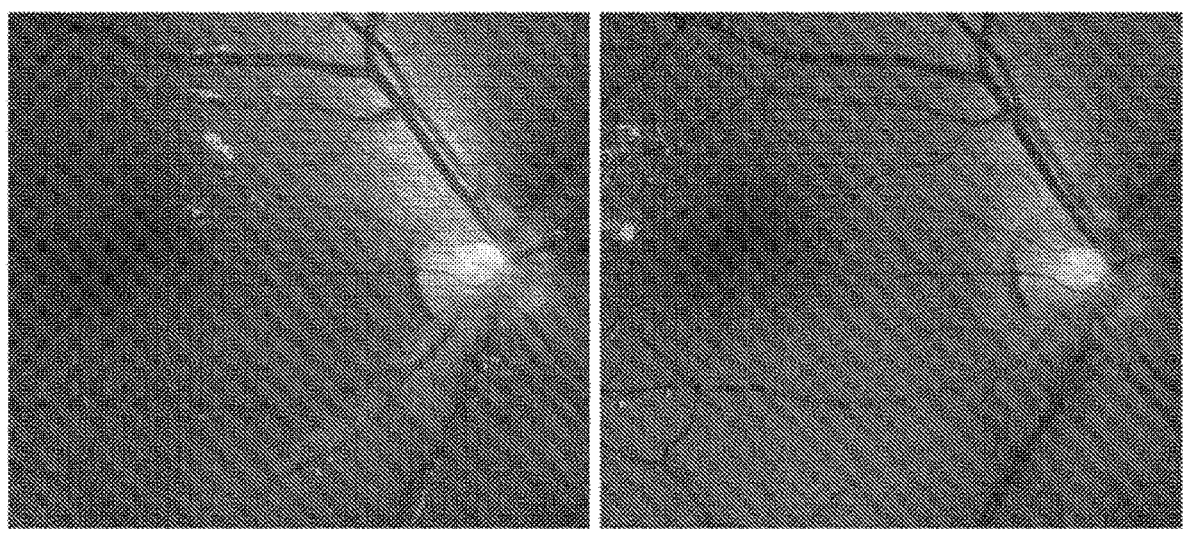
FIG. 29 depicts an example of retinal image without the HDR function (left) and with the proposed HDR function (right) for the same patient.

FIG. 29 shows the difference between an image captured with the HDR function and another without HDR for the same patient, which shows more details and avoids saturated regions for the HDR image. In this image, the difference in image quality in regions such as the macula and optic nerve is notable. It is important to note that during the successive captures, the captured frames may have slight displacements of the eye between them and, for this, an image registration algorithm is used for correction and alignment before the final image composition.

Figure 30:
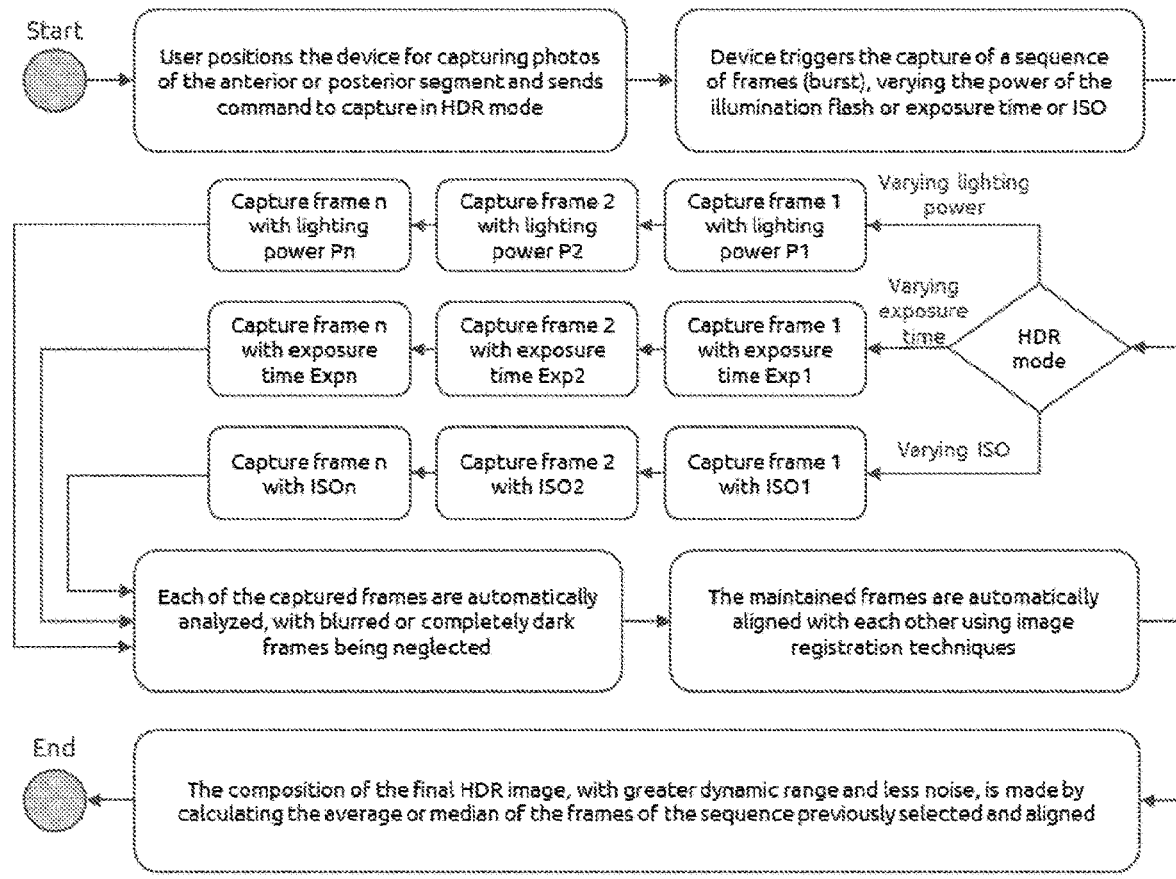
FIG. 30 depicts the steps of obtaining a higher quality image by using the HDR mode along with the variation of lightning power or imaging parameters.

FIG. 30 depicts the steps of obtaining a higher quality image by using the HDR mode along with the variation of lightning power, exposure time and ISO. When the device triggers the capture of a sequence of frames in the HDR mode, each frame, F1 to Fn, is captured with the variation of lightning power, P1 to Pn, exposure time, Exp1 to Expn, and ISO, ISO1 to ISOn. Each of the captured frames are automatically analyzed, where blurred, glare or completely dark frames are automatically removed from the composition of the final HDR image.

The maintained frames are automatically aligned with each other using image registration techniques. The composition of the final HDR image, with greater dynamic range and less noise, is made by blending the aligned frames with techniques like image average or median.

Figure 31:
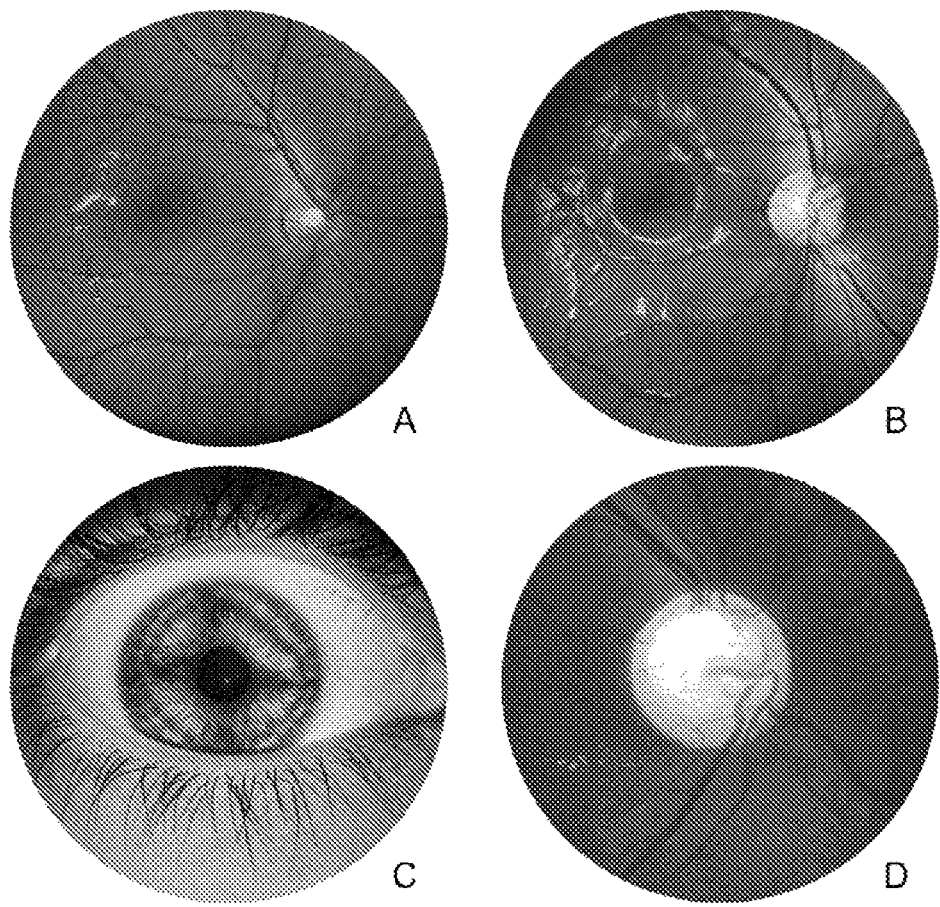
FIG. 31 shows examples of exams captured with one of the embodiments of the invention proposed, showing color retinography (A), red-free retinography (B), anterior segment (C) and optic nerve analysis (D).

Finally, FIG. 31 shows examples of captures made with one of the embodiments of the invention proposed, showing color retinography (A), red-free retinography (B), anterior segment (C) and optic nerve analysis (D).

Although the present disclosure has been described in connection with certain preferred embodiments, it should be understood that it is not intended to limit the disclosure to those particular embodiments. Rather, it is intended to cover all alternatives, modifications and equivalents possible within the spirit and scope of the disclosure as defined by the appended claims.

What is claimed is:

1. Optical imaging system, comprising:
   an optical module; and
   an embedded electronic module in communication with a mobile device,
   wherein the optical module includes:
   a module having two lens subsets and a beam splitter, being used for retinal imaging and lighting and for internal fixation;
   a lighting module, positioned above an aperture for one or more retinal imaging rays, having a light emitting diode having at least one visible wavelength and one or more light-emitting diodes having at least one non-visible wavelength, positioned adjacent to each other;
   a first lens subset forming an intermediate and telecentric retinal image in a mechanical iris controlling the field of view of the mobile device, located in a first plane, as seen on a parallelism between a chief ray and an optical axis in the first plane;
   camera lens conjugating a second plane, referring to the retina, to a third plane, where an image sensor of a camera is located;
   a second lens subset conjugating a plane of the cornea, to an optical aperture, positioned before an entrance pupil of the camera that has its own integrated optics;
   the second lens subset projecting a chief ray of an illumination ray tracing, to cross the optical axis in the first plane of the mechanical iris, in such a way that the entire mechanical iris, which is combined with the plane of the retina, is illuminated homogeneously;
   wherein the chief ray of the illumination ray tracing is telecentric in a region between the mobile device and an eye of the patient, as seen by a parallelism between the illumination chief ray, with the optical axis in the region between the eye and the first lens subset, wherein the parallelism between the chief ray, with the optical axis in the region between the patient's eye and the first lens subset, makes an illumination beam focus in a corneal plane and then diverges and reaches the retina as a homogeneous spot of light that fills the entire field of view observed;
   the optical aperture, being positioned at a distance, d, before the entrance pupil of the camera, with a diameter $\phi 1$, wherein diameter $\phi 1$ is smaller than the aperture diameter of the camera $\phi 2$;
   a light source being positioned at a height, h, from the optical axis and above the optical aperture for retinal imaging, and the ray tracing passes through a beam splitter, a doublet, reaching in sequence the mechanical iris, which also functions as an optical aperture that restricts the diameter of the illumination beam; and
   doublets focusing the beam to form a spot of illumination in the cornea of the eye.

2. The system according to claim 1, wherein the module lacks any other optical component besides the beam splitter that inserts the radiation for internal fixation in the common optical path for retinal imaging and lighting, wherein the module further comprises:

a plurality of light sources and a pinhole located on the plane, which is conjugated with the corneal plane, wherein the beam, initially reflected by the beam splitter, passes through the first and second lens subsets reaching the cornea of the patient in the optical axis; and wherein, by changing a position of the the plurality of light sources, different regions of the eye are registered.

3. The system according to claim 1, further comprising two optical assemblies, in which:
- a first subset is responsible for forming an intermediate and telecentric image of a retina; and
- a second subset projects the intermediate image to be captured by a camera;
- wherein the focal lengths obey the following relationship:

$$1,0 \leq \frac{F_2}{F_1} \leq 3,0$$

where $F_2$ is the effective focal length (EFL) of the second subset, and where $F_1$ is the effective focal length of the first subset.

4. The system according to claim 1, wherein the lighting module includes:
- an internal baffle;
- wherein the one or more light-emitting diodes having a non-visible wavelength is three light-emitting diodes positioned after the internal baffle, along with their emitting centers, adjacent to the emitting center of the light emitting diode having a visible wavelength;
- an external baffle;
- an illumination polarizer with an efficiency for at least a visible wavelength; and
- an aperture of the optical system coinciding with a plane of the light emitting diode having the visible wavelength and having a linear polarizer with its polarization axis rotated 90 degrees in relation to the illumination polarizer.

5. The system according to claim 1, further comprising an additional positive lens, being an achromatic doublet or a singlet lens for capturing images of the anterior segment of the eye.

6. The system according to claim 1, further comprising a rhomboid prism, positioned immediately before the aperture of the optical assembly.

7. A method of using the system of claim 1 for retinal and anterior segment imaging with high dynamic range (HDR), the method comprising the steps of:
- continuously capturing successive frames with different parameters, exposure time and/or ISO;
- automatically removing blurred, glared or completely dark frames from the composition of the final HDR image; and
- aligning the frames of the sequence using image registration techniques and by blending the aligned frames to create the final HDR image.

8. An optical imaging system, comprising:
an optical module; and
an embedded electronic module in communication with a mobile device, wherein the optical module includes:
- a module having two lens subsets and a beam splitter, being used for retinal imaging and lighting and for internal fixation;
- a lighting module, positioned above an aperture for one or more retinal imaging rays, having a light emitting diode having at least one visible wavelength and one or more light-emitting diodes having at least one non-visible wavelength, positioned adjacent to each other;
the optical imaging system further comprising two optical assemblies, in which:
- a first subset is responsible for forming an intermediate and telecentric image of a retina; and
- a second subset projects the intermediate image to be captured by a camera;
- wherein the focal lengths obey the following relationship:

$$1,0 \leq \frac{F_2}{F_1} \leq 3,0$$

where $F_2$ is the effective focal length (EFL) of the second subset, and where $F_1$ is the effective focal length of the first subset.

9. An optical imaging system, comprising:
an optical module; and
an embedded electronic module in communication with a mobile device,
wherein the optical module includes:
- a module having two lens subsets and a beam splitter, being used for retinal imaging and lighting and for internal fixation;
- a lighting module, positioned above an aperture for one or more retinal imaging rays, having a light emitting diode having at least one visible wavelength and one or more light-emitting diodes having at least one non-visible wavelength, positioned adjacent to each other, wherein the lighting module includes:
- an internal baffle;
- wherein the one or more light-emitting diodes having a non-visible wavelength is three light-emitting diodes positioned after the internal baffle, along with their emitting centers, adjacent to the emitting center of the light emitting diode having a visible wavelength;
- an external baffle;
- an illumination polarizer with an efficiency for at least a visible wavelength; and
- an aperture of the optical system coinciding with a plane of the light emitting diode having the visible wavelength and having a linear polarizer with its polarization axis rotated 90 degrees in relation to the illumination polarizer.

* * * * *